(12) United States Patent
Schoch et al.

(10) Patent No.: US 11,235,436 B2
(45) Date of Patent: Feb. 1, 2022

(54) ABRASIVE ARTICLES AND METHODS OF FORMING THE SAME

(71) Applicants: SAINT-GOBAIN ABRASIVES, INC., Worcester, MA (US); SAINT-GOBAIN ABRASIFS, Conflans-Sainte-Honorine (FR); UNIVERSITY OF MASSACHUSETTS, Boston, MA (US)

(72) Inventors: Andrew B. Schoch, Westborough, MA (US); Alexander Nashed, Würzburg (DE); Sena Ada Carleen, Shrewsbury, MA (US); Dean S. Matsumoto, Worcester, MA (US); Anne M. Bonner, Hudson, MA (US); Shaw Ling Hsu, Sunderland, MA (US); Jigneshkumar P. Patel, Chandler, AZ (US); Subrajeet Deshmukh, Amherst, MA (US); Caixia Zhao, Changzhou (CN)

(73) Assignees: SAINT-GOBAIN ABRASIVES, INC., Worcester, MA (US); SAINT-GOBAIN ABRASIFS, Conflans-Sainte-Honorine (FR); UNIVERSITY OF MASSACHUSETTS, Boston, MA (US)

( * ) Notice: Subject to any disclaimer, the term of this patent is extended or adjusted under 35 U.S.C. 154(b) by 201 days.

(21) Appl. No.: 16/314,565

(22) PCT Filed: Jul. 7, 2017

(86) PCT No.: PCT/US2017/041007
§ 371 (c)(1),
(2) Date: Dec. 31, 2018

(87) PCT Pub. No.: WO2018/009737
PCT Pub. Date: Jan. 11, 2018

(65) Prior Publication Data
US 2019/0168358 A1 Jun. 6, 2019

Related U.S. Application Data

(60) Provisional application No. 62/450,253, filed on Jan. 25, 2017, provisional application No. 62/360,005, filed on Jul. 8, 2016.

(51) Int. Cl.
*B24D 3/34* (2006.01)
*B24D 3/28* (2006.01)
*C09K 3/14* (2006.01)

(52) U.S. Cl.
CPC .......... *B24D 3/344* (2013.01); *B24D 3/285* (2013.01); *C09K 3/1409* (2013.01)

(58) Field of Classification Search
CPC .......... B24D 3/28; B24D 3/285; B24D 3/344; B24D 18/0009; B24D 5/12; B24D 3/342; C08L 61/24; C08L 67/00; C08L 79/02; C08L 2666/18; Y10T 428/24405; C09K 3/1409

See application file for complete search history.

(56) References Cited

U.S. PATENT DOCUMENTS

| | | | |
|---|---|---|---|
| 1,537,454 A * | 5/1925 | Brock | B24D 3/285 51/298 |
| 5,032,642 A | 7/1991 | Lemon et al. | |
| 5,051,454 A | 9/1991 | Lemon et al. | |
| 5,219,462 A | 6/1993 | Bruxvoort et al. | |
| 5,340,888 A | 8/1994 | Lemon et al. | |
| 5,958,794 A | 9/1999 | Bruxvoort et al. | |
| 6,217,432 B1 | 4/2001 | Woo | |
| 6,238,449 B1 | 5/2001 | Woo et al. | |
| 6,312,484 B1 | 11/2001 | Chou et al. | |
| 6,669,745 B2 | 12/2003 | Prichard et al. | |
| 8,372,912 B2 | 2/2013 | Olsen et al. | |
| 8,523,967 B2 * | 9/2013 | Arnaud | B24D 3/34 51/298 |
| 8,829,093 B2 | 9/2014 | Dakka et al. | |
| 2003/0009949 A1 | 1/2003 | Prichard et al. | |
| 2011/0157933 A1 | 6/2011 | Nagasaki et al. | |

(Continued)

FOREIGN PATENT DOCUMENTS

| | | |
|---|---|---|
| CN | 1229376 A | 9/1999 |
| CN | 101238175 A | 8/2008 |

(Continued)

OTHER PUBLICATIONS

B. Kamm, M. Gerhardt, G. Dautzenberg, Chapter 5—Catalytic Processes of Lignocellulosic Feedstock Conversion for Production of Furfural, Levulinic Acid, and Formic Acid-Based Fuel Components, Editor(s): Steven L. Suib, New and Future Developments in Catalysis, Elsevier, 2013, pp. 91-113, (Year: 2013).*
Patel et al., "Path to Achieving Molecular Dispersion in a Dense Reactive Mixture," Journal of Polymer Science Part B: Polymer Physics, 2015, vol. 53, pp. 1519-1526.
International Search Report and Written Opinion for PCT/US2017/041007, dated Oct. 17, 2017, 20 pages.
Patel et al., "An analysis of the role of reactive plasticizers in the crosslinking reactions of a rigid resin," Polymer, 2016, vol. 107, pp. 12-18.

(Continued)

*Primary Examiner* — Pegah Parvini
(74) *Attorney, Agent, or Firm* — Abel Schillinger, LLP; Joseph P. Sullivan

(57) ABSTRACT

An abrasive article may include an organic bond material, abrasive particles contained within the organic bond material and a plasticizer contained within the organic bond material. The plasticizer may include at least one of an aromatic phenyl group, a heteroaromatic furyl group, or a saturated aliphatic hydrocarbon. The plasticizer may further include a polar group.

17 Claims, 1 Drawing Sheet

(56) References Cited

U.S. PATENT DOCUMENTS

| | | | |
|---|---|---|---|
| 2013/0137789 A1 | 5/2013 | Olsen et al. | |
| 2013/0157544 A1* | 6/2013 | McArdle | B24B 29/02 451/59 |
| 2013/0203328 A1* | 8/2013 | Givot | B24D 5/04 451/548 |
| 2015/0000204 A1* | 1/2015 | Klett | B24D 3/344 51/298 |
| 2016/0184976 A1* | 6/2016 | Pacella | B24D 3/005 51/295 |

FOREIGN PATENT DOCUMENTS

| | | | |
|---|---|---|---|
| CN | 105073707 A | 11/2015 | |
| EP | 0513772 A2 | 11/1992 | |
| GB | 926759 A | 5/1963 | |
| JP | 2002532261 A | 10/2002 | |
| TW | 580420 B | 3/2004 | |
| TW | 201546043 A | 12/2015 | |
| WO | 9711484 A1 | 3/1997 | |
| WO | 1998010896 A1 | 3/1998 | |
| WO | 0037208 A1 | 6/2000 | |
| WO | 2000037218 A1 | 6/2000 | |
| WO | 2002060985 A1 | 8/2002 | |
| WO | 2012021824 A2 | 2/2012 | |
| WO | 2014117076 A1 | 7/2014 | |
| WO | 2015112285 A1 | 7/2015 | |
| WO | 2018009737 A1 | 1/2018 | |

OTHER PUBLICATIONS

Patel et al., "An analysis of the role of non-reactive plasticizers in the crosslinking reactions of phenolic resins," 32 pgs.

Patel et al., "Characterization of the crosslinking reaction in high performance phenolic resins," Bulletin of the American Physical Society, 2016, vol. 61, No. 2, 28 pgs.

Extended European Search Report for EP Application No. EP17824941. 3, dated Feb. 28, 2020, 9 pages.

* cited by examiner

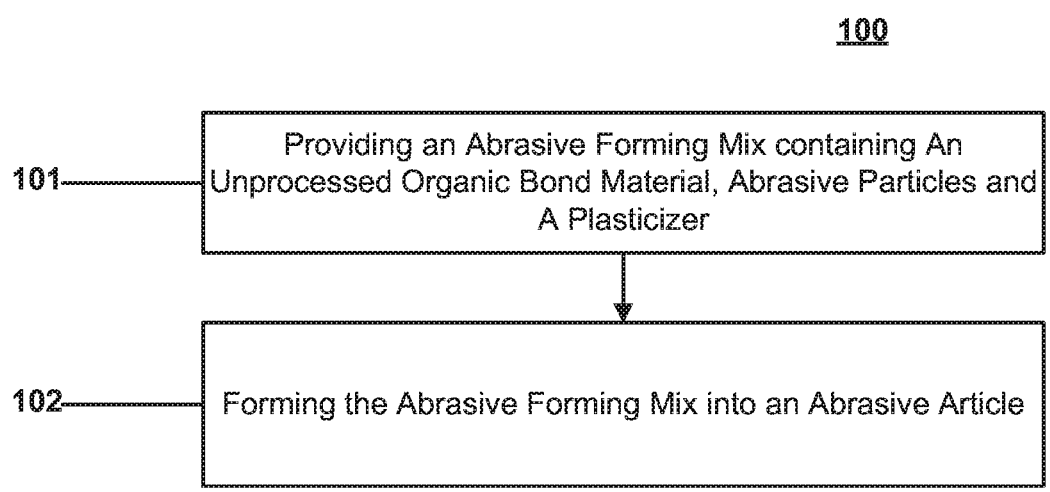

ABRASIVE ARTICLES AND METHODS OF FORMING THE SAME

CROSS-REFERENCE TO RELATED APPLICATIONS

This application is a National Stage entry under 35 U.S.C. § 371 of International Application No. PCT/US2017/041007, filed Jul. 7, 2017, entitled "ABRASIVE ARTICLES AND METHODS OF FORMING THE SAME," by Andrew B. SCHOCH et al., which claims priority to U.S. Provisional Patent Application No. 62/450,253, filed Jan. 25, 2017, entitled "ABRASIVE ARTICLES AND METHODS OF FORMING THE SAME," by Andrew B. SCHOCH et al. and claims priority to U.S. Provisional Patent Application No. 62/360,005, filed Jul. 8, 2016, entitled "ABRASIVE ARTICLES AND METHODS OF FORMING THE SAME," by Andrew B. SCHOCH et al., which all applications are assigned to the current assignees hereof and incorporated herein by reference in their entireties.

FIELD OF THE DISCLOSURE

The following is directed to an abrasive article and a method of forming an abrasive article. More particularly, the following is directed to an abrasive article that includes abrasive particles and a plasticizer within an organic bond material.

DESCRIPTION OF THE RELATED ART

Abrasive articles used in machining applications typically include bonded abrasive articles and coated abrasive articles. Coated abrasive articles are generally layered articles having a backing and an adhesive coat to fix abrasive particles to the backing, the most common example of which is sandpaper. Bonded abrasive articles consist of rigid, and typically monolithic, three-dimensional, abrasive composites in the form of wheels, discs, segments, mounted points, hones and other article shapes, which can be mounted onto a machining apparatus, such as a grinding, polishing or cutting apparatus. Some bonded abrasive articles may be particularly useful in grinding, shaping or cutting certain types of workpieces, including for example, glass materials.

Accordingly, the industry continues to demand improved bonded abrasive articles and methods for their use.

SUMMARY

According to a first aspect, an abrasive article may include an organic bond material, abrasive particles contained within the organic bond material and a plasticizer contained within the organic bond material. The plasticizer may include at least one of an aromatic phenyl group, a heteroaromatic furyl group, or a saturated aliphatic hydrocarbon. The plasticizer may further include a polar group.

According to another aspect, an abrasive article may include an organic bond material, abrasive particles contained within the organic bond material and a plasticizer contained within the organic bond material. The abrasive article may have a crosslinking density factor of at least about 10.

According to another aspect, an abrasive article may include an organic bond material, abrasive particles contained within the organic bond material and a plasticizer contained within the organic bond material. A content of the plasticizer in the abrasive article may be not greater than 5 wt. % for a total weight of the abrasive article. The plasticizer may have a boiling point of at least about 180° C.

According to yet another aspect, an abrasive article may include an organic bond material, abrasive particles contained within the organic bond material and a plasticizer contained within the organic bond material. A content of the plasticizer in the abrasive article may be not greater than 5 wt. % for a total weight of the abrasive article. The plasticizer may have a vapor pressure of not greater than about 267 pascals as measured at a temperature of 20° C.

According to still another aspect, an abrasive article may include an organic bond material, abrasive particles contained within the organic bond material and a plasticizer contained within the organic bond material. The abrasive article may further include a ratio $AAC_{PL}/AAC_{OBM}$ of not greater than about 0.25, where $AAC_{PL}$ is a content of plasticizer in weight percent for a total weight of the abrasive article and $AAC_{OBM}$ is a content of organic bond material in weight percent for a total weight of the abrasive article.

According to another aspect, an abrasive article may include an organic bond material, abrasive particles contained within the organic bond material and a plasticizer contained within the organic bond material. A content of the plasticizer in the abrasive article may be not greater than 5 wt. % for a total weight of the abrasive article. The plasticizer may be a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldehyde, o-tolualdehyde, salicylaldehyde, p-tolualdehyde, and combinations thereof.

According to yet another aspect, an abrasive article may include an organic bond material, abrasive particles contained within the organic bond material, a first plasticizer contained within the organic bond material and a second plasticizer contained within the organic bond material. The first plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldehyde, o-tolualdehyde, salicylaldehyde, p-tolualdehyde, and combinations thereof. The second plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldehyde, o-tolualdehyde, salicylaldehyde, p-tolualdehyde, and combinations thereof.

According to yet still another aspect, an abrasive forming mix may include an organic bond material, abrasive particles and a plasticizer. The plasticizer may include at least one of an aromatic phenyl group, a heteroaromatic furyl group, or a saturated aliphatic hydrocarbon. The plasticizer may further include at least one polar group.

According to yet another aspect, an abrasive forming mix may include an organic bond material, abrasive particles and a plasticizer. The abrasive article may have a crosslinking density factor of at least about 10.

According to another aspect, an abrasive forming mix may include an organic bond material, abrasive particles and a plasticizer. The organic bond material may include a phenolic resin. A content of the plasticizer in the abrasive article may be not greater than 5 wt. % for a total weight of the abrasive forming mix. The plasticizer may have a boiling point of at least about 180° C.

According to still another aspect, an abrasive forming mix may include an organic bond material, abrasive particles and a plasticizer. A content of the plasticizer in the abrasive article may be not greater than 5 wt. % for a total weight of the abrasive forming mix. The plasticizer may include a vapor pressure of not greater than about 267 pascals as measured at a temperature of 20° C.

According to yet another aspect, an abrasive forming mix may include an organic bond material, abrasive particles and a plasticizer. The forming mix may further include a ratio $FMC_{PL}/FMC_{OBM}$ of not greater than about 0.25, where $FMC_{PL}$ is the content of plasticizer in weight percent for a total weight of the abrasive forming mix and $FMC_{OBM}$ is the content of organic bond material in weight percent for a total weight of the abrasive forming mix.

According to still another aspect, an abrasive forming mix may include an organic bond material, abrasive particles and a plasticizer. A content of the plasticizer in the abrasive forming mix may be not greater than 5 wt. % for a total weight of the abrasive forming mix. The plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof.

According to yet another aspect, a forming mix may include an organic bond material, abrasive particles, a first unprocessed plasticizer and a second unprocessed plasticizer. The first unprocessed plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof. The second unprocessed plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof.

According to another aspect, a method of forming an abrasive article may include providing an abrasive forming mix and forming the abrasive forming mix into an abrasive article. The abrasive forming mix may include an organic bond material, abrasive particles and a plasticizer. The plasticizer may include at least one of an aromatic phenyl group, a heteroaromatic furyl group, or a saturated aliphatic hydrocarbon. The plasticizer may further include at least one polar group.

According to yet another aspect, a method of forming an abrasive article may include providing an abrasive forming mix and forming the abrasive forming mix into an abrasive article. The abrasive forming mix may include an organic bond material, abrasive particles and a plasticizer. The abrasive article may have a crosslinking density factor of at least about 10.

According to another aspect, a method of forming an abrasive article may include providing an abrasive forming mix and forming the abrasive forming mix into an abrasive article. The abrasive forming mix may include an organic bond material, abrasive particles and a plasticizer. The organic bond material may include a phenolic resin. A content of the plasticizer in the abrasive article may be not greater than 5 wt. % for a total weight of the abrasive forming mix. The plasticizer may have a boiling point of at least about 180° C.

According to still another aspect, a method of forming an abrasive article may include providing an abrasive forming mix and forming the abrasive forming mix into an abrasive article. The abrasive forming mix may include an organic bond material, abrasive particles and a plasticizer. A content of the plasticizer in the abrasive article may be not greater than 5 wt. % for a total weight of the abrasive forming mix. The plasticizer may include a vapor pressure of not greater than about 267 pascals as measured at a temperature of 20° C.

According to yet another aspect, a method of forming an abrasive article may include providing an abrasive forming mix and forming the abrasive forming mix into an abrasive article. The abrasive forming mix may include an organic bond material, abrasive particles and a plasticizer. The forming mix may further include a forming mix plasticizer ratio $FMC_{PL}/FMC_{OBM}$ of not greater than about 0.25, where $FMC_{PL}$ is the content of plasticizer in weight percent for a total weight of the abrasive forming mix and $FMC_{OBM}$ is the content of organic bond material in weight percent for a total weight of the abrasive forming mix.

According to another aspect, a method of forming an abrasive article may include providing an abrasive forming mix and forming the abrasive forming mix into an abrasive article. The abrasive forming mix may include an organic bond material, abrasive particles and a plasticizer. A content of the plasticizer in the abrasive forming mix may be not greater than 5 wt. % for a total weight of the abrasive forming mix. The plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof.

According to another aspect, a method of forming an abrasive article may include providing an abrasive forming mix and forming the abrasive forming mix into an abrasive article. The abrasive forming mix may include an organic bond material, abrasive particles, a first unprocessed plasticizer and a second unprocessed plasticizer. The first unprocessed plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof. The second unprocessed plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof.

According to still another aspect, a method of forming an abrasive article may include providing an abrasive forming mix and forming the abrasive forming mix into an abrasive article. The abrasive article may include an organic bond material, abrasive particles contained within the organic bond material and a plasticizer contained within the organic bond material. The plasticizer may include at least one of an aromatic phenyl group, a heteroaromatic furyl group, or a saturated aliphatic hydrocarbon. The plasticizer may further include a polar group.

According to another aspect, a method of forming an abrasive article may include providing an abrasive forming mix and forming the abrasive forming mix into an abrasive article. The abrasive article may include an organic bond material, abrasive particles contained within the organic bond material and a plasticizer contained within the organic bond material. The abrasive article may have a crosslinking density factor of at least about 10.

According to still another aspect, a method of forming an abrasive article may include providing an abrasive forming mix and forming the abrasive forming mix into an abrasive article. The abrasive article may include an organic bond material, abrasive particles contained within the organic bond material and a plasticizer contained within the organic bond material. A content of the plasticizer in the abrasive article may be not greater than 5 wt. % for a total weight of the abrasive article. The plasticizer may have a boiling point of at least about 180° C.

According to yet another aspect, a method of forming an abrasive article may include providing an abrasive forming mix and forming the abrasive forming mix into an abrasive article. The abrasive article may include an organic bond material, abrasive particles contained within the organic bond material and a plasticizer contained within the organic bond material. A content of the plasticizer in the abrasive article may be not greater than 5 wt. % for a total weight of the abrasive article. The plasticizer may have a vapor pressure of not greater than about 267 pascals as measured at a temperature of 20° C.

According to still another aspect, a method of forming an abrasive article may include providing an abrasive forming mix and forming the abrasive forming mix into an abrasive article. The abrasive article may include an organic bond material, abrasive particles contained within the organic bond material and a plasticizer contained within the organic bond material. The abrasive article may further include a ratio $AAC_{PL}/AAC_{OBM}$ of not greater than about 0.25, where $AAC_{PL}$ is a content of plasticizer in weight percent for a total weight of the abrasive article and $AAC_{OBM}$ is a content of organic bond material in weight percent for a total weight of the abrasive article.

According to another aspect, a method of forming an abrasive article may include providing an abrasive forming mix and forming the abrasive forming mix into an abrasive article. The abrasive article may include an organic bond material, abrasive particles contained within the organic bond material and a plasticizer contained within the organic bond material. A content of the plasticizer in the abrasive article may be not greater than 5 wt. % for a total weight of the abrasive article. The plasticizer may further be a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof.

According to another aspect, a method of forming an abrasive article may include providing an abrasive forming mix and forming the abrasive forming mix into an abrasive article. The abrasive article may include an organic bond material, abrasive particles, a first plasticizer contained within the organic bond material and a second plasticizer contained within the organic bond material. The first plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof. The second plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof.

BRIEF DESCRIPTION OF THE DRAWINGS

The present disclosure may be better understood, and its numerous features and advantages made apparent to those skilled in the art by referencing the accompanying drawings.

FIG. 1 includes a flow chart illustrating a process for forming an abrasive article according to one embodiment.

The use of the same reference symbols in different drawings indicates similar or identical items.

DETAILED DESCRIPTION OF THE PREFERRED EMBODIMENT(S)

Abrasive articles and techniques are disclosed herein that may be used in abrasive grinding operations. In particular, abrasive articles disclosed herein may include an organic bond material, abrasive particles contained within the organic bond material and a plasticizer contained within the organic bond material.

FIG. 1 includes a flow chart illustrating a method of forming an abrasive article in accordance with embodiments described herein. As illustrated in FIG. 1, a process 100 may include a step 101 of providing an abrasive forming mix that may include an unprocessed organic bond material, abrasive particles and a plasticizer and a step 102 of forming the abrasive forming mix into an abrasive article. The unprocessed bond material composite may include organic bond material and a filler material.

It will be appreciated that unprocessed materials referenced herein refer to materials that have not undergone the forming process of step 102 as described herein. It will be further appreciated that unprocessed materials referenced herein may have undergone other processing or preprocessing steps prior to being added to the mixture described in step 101. It will also be appreciated that unprocessed materials referenced herein may, or may not, undergo a chemical or physical change during the forming process of step 102 described herein. Thus, it will be appreciated that any description of the unprocessed materials referenced herein (i.e., size, composition, or content) may, but does not necessarily, apply to that material in the finally formed abrasive article.

According to particular embodiments, the abrasive particles included in the abrasive forming mix may include materials such as oxides, carbides, nitrides, borides, carbon-based materials (e.g., diamond), oxycarbides, oxynitrides, oxyborides, and a combination thereof. According to other embodiments, the abrasive particles can include a superabrasive material. According to still other embodiments, the abrasive particles may include a material selected from the group of silicon dioxide, silicon carbide, alumina, white alumina, zirconia, flint, garnet, emery, rare earth oxides, rare earth-containing materials, cerium oxide, sol-gel derived particles, gypsum, iron oxide, glass-containing particles, or combinations thereof. In another instance, abrasive particles may also include silicon carbide, brown fused alumina, seeded gel abrasive, sintered alumina with additives, shaped and sintered aluminum oxide, pink alumina, ruby alumina, electrofused monocrystalline alumina, alumina zirconia abrasives, extruded bauxite, sintered bauxite, cubic boron nitride, diamond, aluminum oxy-nitride, sintered alumina, extruded alumina, or any combination thereof. According to yet other embodiments, the abrasive particles consist essentially of silicon carbide. According to still other embodiments, the abrasive particles may have a Mohs hardness or at least 7, such as at least 8, or even at least 9.

According to particular embodiments, the abrasive particles included in the abrasive forming mix may consist of materials such as oxides, carbides, nitrides, borides, carbon-based materials (e.g., diamond), oxycarbides, oxynitrides, oxyborides, and a combination thereof. According to other embodiments, the abrasive particles can consist of a superabrasive material. According to still other embodiments, the abrasive particles may consist of a material selected from the group of silicon dioxide, silicon carbide, alumina, white alumina, zirconia, flint, garnet, emery, rare earth oxides, rare earth-containing materials, cerium oxide, sol-gel derived particles, gypsum, iron oxide, glass-containing particles, or combinations thereof. In another instance, abrasive particles may consist of silicon carbide, brown fused alumina, seeded gel abrasive, sintered alumina with additives, shaped and sintered aluminum oxide, pink alumina, ruby alumina, electrofused monocrystalline alumina, alumina zirconia abrasives, extruded bauxite, sintered bauxite, cubic boron nitride, diamond, aluminum oxy-nitride, sintered alumina, extruded alumina, or any combination thereof.

According to yet other embodiments, the abrasive particles included in the abrasive forming mix may include a coating, which may facilitate formation and performance of the abrasive article. In certain embodiments, the coating may be a metal coating, for example, nickel. According to still other embodiments, the coating may be iron oxide, a silane, such as, gamma amino propyl triethoxy silane, or even silica.

According to certain embodiments, the coating of the abrasive particles may have a specific thickness. For example, the average thickness of the coating of the abrasive particles can be at least about 1.25 microns, such as, at least about 1.5 microns, at least about 1.75 microns, at least about 2.0 microns, at least about 2.25 microns, at least about 2.5 microns, or at least about 3.0 microns. The average thickness can be limited, however, such as not greater than about 8.0 microns, not greater than about 7.5 microns, not greater than 7.0 microns, not greater than about 6.5 microns, not greater than 6.0 microns, not greater than about 5.5 microns, not greater than 5.0 microns, not greater than 4.5 microns, or not greater than 4.0 microns. It will be appreciated that the average thickness of the coating may be within a range between any of the minimum and maximum values noted above. It will be further appreciated that the average thickness of the coating may be any value between any of the minimum and maximum values noted above.

According to other embodiments, the coating of the abrasive particles can be formed to overlie a specific portion of the exterior surface of each abrasive particle. For example, the coating may overly at least about 50% of the exterior surface area of the abrasive particle, such as, at least about 60%, at least about 70%, at least about 80%, at least about 90%, even at least about 95%, or essentially the entire exterior surface of the abrasive particles. In still other embodiments, the coating may overly not greater than about 99% of the exterior surface area of the abrasive particle, such as, not greater than about 95%, not greater than about 90%, not greater than about 80%, not greater than about 70% or even not greater than about 60% of the exterior surface of the abrasive particles. It will be appreciated that the coating may overly any percent of the abrasive particle within a range between any of the minimum and maximum values noted above. It will be further appreciated that the coating may overly any percent of the surface of the abrasive particle between any of the minimum and maximum values noted above.

In further reference to the abrasive particles, according to certain embodiments, the morphology of the abrasive particles may be described by an aspect ratio, which is a ratio between the dimensions of length to width. It will be appreciated that the length is the longest dimension of the abrasive particle and the width is the second longest dimension of a given abrasive particle. In accordance with embodiments herein, the abrasive particles may have an aspect ratio (length:width) of not greater than about 10:1, such as, not greater than about 9:1, not greater than about 8:1, not greater than about 7:1, not greater than about 6:1, not greater than about 5:1, not greater than about 4:1, not greater than about 3:1, not greater than about 2:1 or even not greater than about 1.5:1. In particular instances, the abrasive particles may be essentially equiaxed, such that they have an aspect ratio of approximately 1:1.

According to still other embodiments, the abrasive particles may include shaped abrasive particles. According to yet other embodiments, the shaped abrasive particles may be regularly shaped or irregularly shaped abrasive particles.

According to still other embodiments, the abrasive forming mix for forming the abrasive article may include a particular content of abrasive particles. For example, the content of abrasive particles in the abrasive forming mix may be at least about 60 wt. % for a total weight of the abrasive forming mix, such as, at least about 63 wt. %, at least about 65 wt. %, at least about 68 wt. %, at least about 70 wt. %, at least about 73 wt. %, at least about 75 wt. %, at least about 78 wt. %, at least about 80 wt. %, at least about 83 wt. %, at least about 85 wt. % or even at least about 88 wt. %. According to still other embodiments, the content of abrasive particle in the abrasive forming mix may be not greater than about 98 wt. % for a total weight of the abrasive forming mix, such as, not greater than about 95 wt. %, not greater than about 92 wt. %, not greater than about 90 wt. %, not greater than about 87 wt. %, not greater than about 85 wt. %, not greater than about 82 wt. %, not greater than about 80 wt. %, not greater than about 77 wt. %, not greater than about 75 wt. %, not greater than about 72 wt. % or even not greater than about 70 wt. %. It will be appreciated that the content of abrasive particles in the abrasive forming mix may be within a range between any of the minimum and maximum values noted above. It will be further appreciated that the content of abrasive particles in the abrasive forming mix may be any value between any of the minimum and maximum values noted above.

According to still other embodiments, the abrasive forming mix for forming the abrasive article may include a particular content of unprocessed bond material. For example, the content of unprocessed bond material in the abrasive forming mix may be at least about 2 wt. % for a total weight of the abrasive forming mix, such as, at least about 5 wt. %, at least about 7 wt. %, at least about 10 wt. %, at least about 12 wt. %, at least about 15 wt. %, at least about 17 wt. % or at least about 20 wt. %. According to still other embodiments, the content of unprocessed bond material in the mixture may be not greater than about 30 wt. % for a total weight of the abrasive forming mix, such as, not greater than about 27 wt. %, not greater than about 25 wt. %, not greater than about 22 wt. %, not greater than about 20 wt. %, not greater than about 17 wt. %, not greater than about 15 wt. % or even not greater than about 12 wt. %. It will be appreciated that the content of unprocessed bond material in the abrasive forming mix may be within a range between any of the minimum and maximum values noted above. It will be further appreciated that the content of unprocessed bond material in the abrasive forming mix may be any value between any of the minimum and maximum values noted above.

According to yet other embodiments, the abrasive forming mix for forming the abrasive article may include a particular content of unprocessed organic bond material. For example, the content of unprocessed organic bond material in the abrasive forming mix may be at least about 2 wt. % for a total weight of the abrasive forming mix, such as, at least about 5 wt. %, at least about 7 wt. %, at least about 10 wt. %, at least about 12 wt. %, at least about 14 wt. %, at least about 16 wt. % or even at least about 18 wt. %. According to still other embodiments, the content of unprocessed organic bond material in the abrasive forming mix may be not greater than about 30 wt. % for a total weight of the abrasive forming mix, such as, not greater than about 27 wt. %, not greater than about 25 wt. %, not greater than about 22 wt. %, not greater than about 20 wt. %, not greater than about 17 wt. %, not greater than about 15 wt. %, not greater than about 12 wt. %, not greater than about 10 wt. %, not greater than about 7 wt. % or even not greater than about 5 wt. %. It will be appreciated that the content of unprocessed organic bond material in the abrasive forming mix may be within a range between any of the minimum and maximum values noted above. It will be further appreciated that the content of unprocessed organic bond material in the abrasive forming mix may be any value between any of the minimum and maximum values noted above.

According to yet other embodiments, the unprocessed organic bond material may be any suitable organic bond material for use in an abrasive article. According to certain embodiments, the organic bond material may be a resin bond material. According to still other embodiments, the organic bond material may be thermoset organic bond materials or thermoplastic organic bond materials. According to still other embodiments, the organic bond material may include suitable organic bond materials for abrasive articles, such as, phenolics, epoxies, polyimides, polyamides, resins, aramids, epoxies, polyesters, polyurethanes, polybenzimidazoles, cyanate esters, polybenzoxazines, shellac, cork, rubber or any combinations thereof. According to yet another embodiment, the organic bond material may include rubber. According to still other embodiments, the organic bond material may include shellac. According to still other embodiments, the organic bond material may include a phenolic resin. According to still other embodiments, the organic bond material may consist of a phenolic resin.

According to particular embodiments, the unprocessed organic bond material in the abrasive forming mix may include an unprocessed phenolic resin. According to still other embodiments, the unprocessed organic bond material in the abrasive forming mix may include a particular content of unprocessed phenolic resin. For example, the content of unprocessed phenolic resin in the unprocessed organic bond material may at least about 50 wt. % for a total weight of the unprocessed organic bond material, such as, at least about 55 wt. %, at least about 60 wt. %, at least about 65 wt. %, at least about 70 wt. %, at least about 75 wt. %, at least about 80 wt. %, at least about 85 wt. %, at least about 90 wt. %, at least about 95 wt. % or even at least about 98 wt. %. According to still other embodiments, the unprocessed organic bond material may consist essentially of unprocessed phenolic resin. According to yet other embodiments, the content of unprocessed phenolic resin in the organic bond material may be not greater than about 99 wt. % for a total weight of the organic bond material, such as, not greater than about 95 wt. %, not greater than about 90 wt. %, not greater than about 85 wt. %, not greater than about 80 wt. %, not greater than about 75 wt. %, not greater than about 70 wt. %, not greater than about 65 wt. %, not greater than about 60 wt. % or even not greater than about 55 wt. %. It will be appreciated that the content of unprocessed phenolic resin in the unprocessed bond material may be within a range between any of the minimum and maximum values noted above. It will be appreciated that the content of unprocessed phenolic resin in the unprocessed bond material may be any value between any of the minimum and maximum values noted above.

According to yet other embodiments, the abrasive forming mix for forming the abrasive article may include a particular content of unprocessed phenolic resin. For example, the content of unprocessed phenolic resin in the abrasive forming mix may be at least about 2 wt. % for a total weight of the abrasive forming mix, such as, at least about 5 wt. %, at least about 7 wt. %, at least about 10 wt. %, at least about 12 wt. %, at least about 14 wt. %, at least about 16 wt. % or even at least about 18 wt. %. According to still other embodiments, the content of unprocessed phenolic resin in the abrasive forming mix may be not greater than about 20 wt. % for a total weight of the abrasive forming mix, such as, not greater than about 17 wt. %, not greater than about 15 wt. %, not greater than about 12 wt. %, not greater than about 10 wt. %, not greater than about 7 wt. % or even not greater than about 5 wt. %. It will be appreciated that the content of unprocessed phenolic resin in the abrasive forming mix may be within a range between any of the minimum and maximum values noted above. It will be further appreciated that the content of unprocessed phenolic resin in the abrasive forming mix may be any value between any of the minimum and maximum values noted above.

According to still other embodiments, the abrasive forming mix for forming the abrasive article may further include an unprocessed filler material. According to particular embodiments, the abrasive forming mix for forming the abrasive article may include a particular content of unprocessed filler material. For example, the content of unprocessed filler material in the abrasive forming mix may be at least about 4 wt. % for a total weight of the abrasive forming mix, such as, at least about 6 wt. %, at least about 8 wt. %, at least about 10 wt. %, at least about 12 wt. %, at least about 14 wt. %, at least about 16 wt. % or even at least about 18 wt. %. According to still other embodiments, the content of unprocessed filler material in the abrasive forming mix may be not greater than about 50 wt. % for a total weight of the abrasive forming mix, such as, not greater than about 47 wt. %, not greater than about 45 wt. %, not greater than about 42 wt. %, not greater than about 40 wt. %, not greater than about 37 wt. %, not greater than about 35 wt. %, not greater than about 32 wt. %, not greater than about 30 wt. %, not greater than about 27 wt. %, not greater than about 25 wt. %, not greater than about 22 wt. % or even not greater than about 20 wt. %. It will be appreciated that the content of unprocessed filler material in the abrasive forming mix may be within a range between any of the minimum and maximum values noted above. It will be further appreciated that the content of unprocessed filler material in the abrasive forming mix may be any value between any of the minimum and maximum values noted above.

According to still other embodiments, the unprocessed filler materials may include particular fillers. According to still other embodiments, the fillers may or may not be present in the finally-formed abrasive article. According to certain embodiments, the unprocessed fillers may include any material selected from the group consisting of powders, granules, spheres, fibers, and a combination thereof. Moreover, in particular instances, the unprocessed fillers can include an inorganic material, an organic material, fibers, woven materials, non-woven materials, particles, minerals, nuts, shells, oxides, alumina, carbide, nitrides, borides, polymeric materials, naturally occurring materials, and a combination thereof. In a certain embodiment, the unprocessed fillers can include a material such as sand, bubble alumina, chromites, magnesite, dolomites, bubble mullite, borides, titanium dioxide, carbon products (e.g., carbon black, coke or graphite), silicon carbide, wood flour, clay, talc, hexagonal boron nitride, molybdenum disulfide, feldspar, glass spheres, glass fibers, chlorine containing fillers, potassium chloride, complex salts of manganese, potassium, chloride, $CaF_2$, Cryolite ($Na_3AlF_6$), potassium Cryolite ($K_3AlF_6$), pyrites, ZnS, copper sulfide, mineral oil, fluorides, carbonates, calcium carbonate, wollastonite, mullite, steel, iron, copper, brass, bronze, tin, aluminum, kyanite, alusite, garnet, quartz, fluoride, mica, nepheline syenite, sulfates (e.g., barium sulfate), carbonates (e.g., calcium carbonate), titanates (e.g., potassium titanate fibers), rock wool, clay, sepiolite, iron sulfide (e.g., $Fe_2S_3$, $FeS_2$, or a combination thereof), potassium fluoroborate ($KBF_4$), zinc borate, borax, boric acid, fine alundum powders, P15A, cork, glass spheres, silica microspheres (Z-light), silver, Saran™ resin, paradichlorobenzene, oxalic acid, alkali halides, organic halides, attapulgite or any combination thereof.

According to yet other embodiments, the abrasive forming mix may include an unprocessed plasticizer having particular characteristic. For example, the unprocessed plasticizer may have at least one of an aromatic phenyl group, a heteroaromatic furyl group, or a saturated aliphatic hydrocarbon. According to still other embodiments, the unprocessed plasticizer may have an aromatic phenyl group, a heteroaromatic furyl group, or a saturated aliphatic hydrocarbon. According to another embodiment, the unprocessed plasticizer may have at least one polar group.

According to yet other embodiments, when the plasticizer is a saturated aliphatic hydrocarbon, the saturated aliphatic hydrocarbon may be a low viscosity saturated aliphatic hydrocarbon.

According to still other embodiments, the low viscosity saturated aliphatic hydrocarbon may have a particular carbon chain length. For example, the low viscosity saturated aliphatic hydrocarbon may have a carbon chain length of at least about 10 carbon atoms, such as, at least about 12 carbon atoms, at least about 14 carbon atoms, at least about 16 carbon atoms, at least about 18 carbon atoms or even at least about 20 carbon atoms. According to still other embodiments, the low viscosity saturated aliphatic hydrocarbon may have a chain length of not greater than about 40 carbon atoms, such as, not greater than about 38 carbon atoms, not greater than about 36 carbon atoms, not greater than about 34 carbon atoms, not greater than about 32 carbon atoms or even not greater than about 30 carbon atoms. It will be appreciated that the low viscosity saturated aliphatic hydrocarbon may have a chain length within a range between any of the minimum and maximum values noted above. It will be further appreciated that the low viscosity saturated aliphatic hydrocarbon may have a chain length of any value between any of the minimum and maximum values noted above.

According to yet another embodiment, the unprocessed plasticizer may include a functional group selected from the group consisting of an aldehyde, a ketone, an ester, an ether, an alcohol, an amine, an amide and combinations thereof. According to yet another embodiment, the unprocessed plasticizer may consist of a functional group selected from the group consisting of an aldehyde, a ketone, an ester, an ether, an alcohol, an amine, an amide and combinations thereof.

According to yet another embodiment, the unprocessed plasticizer may have a particular boiling point as measured according to ASTM E1719-12. For example, the unprocessed plasticizer may have a boiling point of at least about 180° C., such as, at least about 200° C., at least about 220° C., at least about 240° C., at least about 260° C., at least about 280° C., at least about 300° C., at least about 320° C. or even at least about 340° C. According to still other embodiments, the plasticizer may have a boiling point of not greater than about 500° C., such as, not greater than about 490° C., not greater than about 480° C., not greater than about 470° C., not greater than about 460° C. or even not greater than about 450° C. It will be appreciated that the unprocessed plasticizer may have a boiling point within a range between any of the minimum and maximum values noted above. It will be further appreciated that the unprocessed plasticizer may have a boiling point of any value between any of the minimum and maximum values noted above.

According yet another embodiment, the plasticizer may have a particular vapor pressure as measured at a temperature of 20° C. according to ASTM D2879-10. For example, the unprocessed plasticizer may have a vapor pressure of not greater than about 267 pascals, such as, not greater than about 260 pascals, not greater than about 250 pascals, not greater than about 240 pascals, not greater than about 230 pascals, not greater than about 220 pascals, not greater than about 210 pascals, not greater than about 200 pascals, not greater than about 150 pascals, not greater than about 100 pascals or even not greater than about 50 pascals. According to yet another embodiment, the unprocessed plasticizer may have a vapor pressure of at least about 0.2 pascals such as, at least about 1 pascals, at least about 5 pascals, at least about 10 pascals or even at least about 25 pascals. It will be appreciated that the unprocessed plasticizer may have a vapor pressure within a range between any of the minimum and maximum values noted above. It will be further appreciated that the unprocessed plasticizer may have a vapor pressure of any value between any of the minimum and maximum values noted above.

According to yet another embodiment, the unprocessed plasticizer may be liquid at room temperature. According to still another embodiment, the unprocessed plasticizer may be a liquid at a temperature of 25° C.

According to still other embodiments, the unprocessed plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof.

According to still other embodiments, the unprocessed plasticizer may consist of a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof.

According to yet other embodiments, the abrasive forming mix for forming the abrasive article may include a particular content of unprocessed plasticizer. For example, the content of unprocessed plasticizer in the abrasive forming mix may be not greater than about 5 wt. % for a total weight of the abrasive forming mix, such as, not greater than about 4.5 wt. %, not greater than about 4.0 wt. %, not greater than about 3.5 wt. %, not greater than about 3.0 wt. %, not greater than about 2.5 wt. %, not greater than about 2.0 wt. %, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. % or even not greater than about 1 wt. %. According to still other embodiments, the content of unprocessed plasticizer in the abrasive forming mix may at least about 0.001 wt. %, such as, at least about 0.01 wt. % or even at least about 0.1 wt. %. It will be appreciated that the content of unprocessed plasticizer in the abrasive forming mix may be within a range between any of the minimum and maximum values noted above. It will be further appreciated that the content of unprocessed plasticizer in the abrasive forming mix may be any value between any of the minimum and maximum values noted above.

According to yet another embodiment, the abrasive forming mix for forming the abrasive article may include a particular ratio $FMC_{PL}/FMC_{OBM}$, where $FMC_{PL}$ is the content of unprocessed plasticizer in weight percent for a total weight of the abrasive forming mix and $FMC_{OBM}$ is the content of unprocessed organic bond material in weight percent for a total weight of the abrasive forming mix. For example, the ratio $FMC_{PL}/FMC_{OBM}$ may be not greater than about 0.25, such as, not greater than about 0.2, not greater than about 0.15, not greater than about 0.1 or even not greater than about 0.05. According to still other embodiments, the ratio $FMC_{PL}/FMC_{OBM}$ may be at least about 0.001, such as, at least about 0.01, at least about 0.02, at least about 0.03 or even at least about 0.04. It will be appreciated that the ratio $FMC_{PL}/FMC_{OBM}$ may be within a range between any of the minimum and maximum values noted above. It will be further appreciated that the ratio $FMC_{PL}/FMC_{OBM}$ may be any value between any of the minimum and maximum values noted above.

According to still other embodiments, the abrasive forming mix for forming the abrasive article may include a particular ratio $FMC_{PL}/FMC_{AP}$, where $FMC_{PL}$ represents the content of unprocessed plasticizer in the forming mixture in wt. % for a total weight of the forming mixture and $FMC_{AP}$ represents the content of unprocessed abrasive particles in the forming mixture in wt. % for a total weight of the forming mixture. For example, the ratio $FMC_{PL}/FMC_{AP}$ may be at least about 0.001, such as, at least about 0.002, at least about 0.003, at least about 0.004 or even at least about 0.005. According to still other embodiments, the ratio $FMC_{PL}/FMC_{AP}$ may be not greater than about 0.3, such as, not greater than about not greater than about 0.25, not greater than about 0.20, not greater than about 0.15 or even not greater than about 0.1. It will be appreciated that the ratio $FMC_{PL}/FMC_{AP}$ may be within a range between any of the minimum and maximum values noted above. It will be further appreciated that ratio $FMC_{PL}/FMC_{AP}$ may be any value between any of the minimum and maximum values noted above.

According to yet other embodiments, the abrasive forming mix may include multiple unprocessed plasticizers. For example, the abrasive forming mix may include a first unprocessed plasticizer and a second unprocessed plasticizer. According to particular embodiments, the first unprocessed plasticizer may be distinct from the second unprocessed plasticizer.

According to yet other embodiments, the first unprocessed plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde or combinations thereof.

According to still other embodiments, the second unprocessed plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde or combinations thereof.

According to yet other embodiments, the abrasive forming mix may include a particular plasticizer ratio $FMC_{PL1}/FMC_{PL2}$, where $FMC_{PL1}$ is equal to the content of the first unprocessed plasticizer in the forming mix and $FMC_{PL2}$ is equal to the content of the second unprocessed plasticizer in the forming mix. For example, the abrasive forming mix may include a plasticizer ratio $FMC_{PL1}/FMC_{PL2}$ or at least about 0.2, such as, at least about 0.23, at least about 0.25, at least about 0.28, at least about 0.3, at least about 0.33 or even at least about 0.35. According to still other embodiments, the abrasive forming mix may include a plasticizer ratio $FMC_{PL1}/FMC_{PL2}$ of not greater than about 0.8, such as not greater than about 0.78, not greater than about 0.75, not greater than about 0.73, not greater than about 0.70, not greater than about 0.68, not greater than about 0.65, not greater than about 0.63, not greater than about 0.6, not greater than about 0.58, not greater than about 0.55 or even not greater than about 0.53. It will be appreciated that the plasticizer ratio $FMC_{PL1}/FMC_{PL2}$ may be within a range between any of the minimum and maximum values noted above. It will be further appreciated that the plasticizer ratio $FMC_{PL1}/FMC_{PL2}$ may be any value between any of the minimum and maximum values noted above.

According to yet other embodiments, the abrasive forming mix may include a particular combined content of the first unprocessed plasticizer in the forming mix and the second unprocessed plasticizer in the forming mix. For example, the combined content of the first unprocessed plasticizer in the forming mix and the second unprocessed plasticizer in the forming mix may be not greater than 5 wt. % for a total weight of the forming mix, such as, not greater than about 4.5 wt. %, not greater than about 4.0 wt. %, not greater than about 3.5 wt. %, not greater than about 3.0 wt. %, not greater than about 2.5 wt. %, not greater than about 2.0 wt. %, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. % or even not greater than about 1 wt. %. According to other embodiments, the abrasive forming mix may include a combined content of the first unprocessed plasticizer in the forming mix and the second unprocessed plasticizer in the forming mix of at least about 0.001 wt. % for a total weight of the forming mix, such as, at least about 0.01 wt. % or even at least about 0.1 wt. %. It will be appreciated that the combined content of the first unprocessed plasticizer in the forming mix and the second unprocessed plasticizer in the forming mix may be within a range between any of the minimum and maximum values noted above. It will be further appreciated that the combined content of the first unprocessed plasticizer in the forming mix and the second unprocessed plasticizer in the forming mix may be any value between any of the minimum and maximum values noted above.

According to other embodiments, the abrasive forming mix may include a particular content of the first unprocessed plasticizer. For example, the content of the first unprocessed plasticizer in the forming mix may be not greater than 2.5 wt. % for a total weight of the forming mix, such as, not greater than about 2.0 wt. %, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. % or even not greater than about 1 wt. %. According to still other embodiments, the content of the first unprocessed plasticizer in the forming mix may be at least about 0.001 wt. % for a total weight of the abrasive article, such as, at least about 0.01 wt. % or even at least about 0.1 wt. %. It will be appreciated that the content of the first unprocessed plasticizer in the forming mix may be within a range between any of the minimum and maximum values noted above. It will be further appreciated that the content of the first unprocessed plasticizer in the forming mix may be any value between any of the minimum and maximum values noted above.

According to still other embodiments, the abrasive forming mix may include a particular content of the second unprocessed plasticizer. For example the content of the second unprocessed plasticizer in the forming mix may be not greater than 5 wt. % for a total weight of the forming mix, such as, not greater than about 4.5 wt. %, not greater than about 4.0 wt. %, not greater than about 3.5 wt. %, not greater than about 3.0 wt. %, not greater than about 2.5 wt. %, not greater than about 2.0 wt. %, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. % or even not greater than about 1 wt. %. According to yet other embodiments, the content of the second unprocessed plasticizer in the forming mix may be at least about 0.001 wt. % for a total weight of the forming mix, such as, at least about 0.01 wt. % or even at least about 0.1 wt. %. It will be appreciated that the content of the second unprocessed plasticizer in the forming mix may be within a range between any of the minimum and maximum values noted above. It will be further appreciated that the content of the second unprocessed plasticizer in the forming mix may be any value between any of the minimum and maximum values noted above.

Referring back to FIG. 1, step 102 of forming the abrasive forming mix into a bonded abrasive article may include forming the abrasive forming mix into any desired three-dimensional shape, for example, the abrasive forming mix may be formed into wheels, discs, segments, mounted points, hones and other article shapes, which may be mounted onto a machining apparatus, such as a grinding or polishing apparatus. According to particular embodiments, the three-dimensional shape may be of any desired size.

According to certain embodiments, the abrasive forming mix may be formed into an abrasive wheel. According to still other embodiments, the abrasive wheel may have a particular diameter. For example, the abrasive wheel may have a diameter of at least about 35 mm, such as, at least about 50 mm, a least about 100 mm, at least about 300 mm, at least about 500 mm, at least about 800 mm, at least about 1000 mm, at least about 1300 mm or even at least about 1500 mm. According to still other embodiments, the abrasive wheel may have a diameter of not greater than about 2500, such as, not greater than about 2200 mm, not greater than about 2000 mm, not greater than about 1700 mm, not greater than about 1500 mm, not greater than about 1200 mm or even not greater than about 1000 mm. It will be appreciated that the abrasive wheel may have a diameter within a range between any of the minimum and maximum values noted above. It will be further appreciated that the abrasive wheel may have a diameter of any value between any of the minimum and maximum values noted above.

According to still other embodiments, the abrasive wheel may have a particular thickness. For example, the abrasive wheel may have a thickness of at least about 0.5 mm, such as, at least about 1.0 mm, at least about 3 mm, at least about 5 mm, at least about 8 mm, at least about 10 mm, at least about 13 mm, at least about 15 mm, at least about 18 mm or even at least about 20 mm. According to still other embodiments, the abrasive wheel may have a thickness of not greater than about 350 mm, such as, not greater than about 300 mm, not greater than about 250 mm, not greater than about 200 mm, not greater than about 150 mm, not greater than about 100 mm, not greater than about 50 mm, not greater than about 30 mm, not greater than about 27 mm, not greater than about 25 mm, not greater than about 22 mm, not greater than about 20 mm, not greater than about 17 mm, not 15 mm, not greater than about 12 mm, not grater than about 10 mm. It will be appreciated that the abrasive wheel may have a thickness within a range between any of the minimum and maximum values noted above. It will be further appreciated that the abrasive wheel may have a thickness of any value between any of the minimum and maximum values noted above.

According to particular embodiments, the abrasive forming mix may be formed into a bonded abrasive article using hot-pressing. Hot-pressing of the abrasive forming mix may be carried out at a temperature of at least about 50° C., such as, at least about 60° C., at least about 70° C., at least about 80° C., at least about 90° C., at least about 100° C., at least about 110° C., at least about 120° C., at least about 130° C., at least about 140° C. or even at least about 150° C. In still other embodiments, hot-pressing of the abrasive forming mix may be carried out at a temperature of not greater than about 200° C., not greater than about 190° C., not greater than about 180° C., not greater than about 170° C. or even not greater than about 160° C. It will be appreciated that hot-pressing of the abrasive forming mix may be carried out at any temperature within a range between any of the minimum and maximum values noted above. It will be further appreciated that hot-pressing of the abrasive forming mix may be carried out at any temperature between any of the minimum and maximum values noted above.

According to other embodiments, hot-pressing of the abrasive forming mix may be carried out at a pressure of at least about 0.5 tons/in$^2$, such as, at least about 1.0 tons/in$^2$, at least about 1.5 tons/in$^2$, at least about 2.0 tons/in$^2$, at least about 2.5 tons/in$^2$ or even a least about 2.9 tons/in$^2$. In still other embodiments, hot-pressing of the abrasive forming mix may be carried out at a temperature of not greater than about 3 tons/in$^2$, not greater than about 2.5 tons/in$^2$, not greater than about 2.0 tons/in$^2$, not greater than about 1.5 tons/in$^2$ or even not greater than about 2.0 tons/in$^2$. It will be appreciated that hot-pressing of the abrasive forming mix may be carried out at any pressure within a range between any of the minimum and maximum values noted above. It will be further appreciated that hot-pressing of the abrasive forming mix may be carried out at any pressure between any of the minimum and maximum values noted above.

In still other embodiments, the abrasive forming mix may be formed into a bonded abrasive tool using cold-pressing. Cold-pressing of the abrasive forming mix may be carried out at a temperature of at least about 5° C., such as, at least about 8° C., at least about 10° C., at least about 12° C., at least about 14° C., at least about 16° C., at least about 18° C. or even at least about 20° C. In still other embodiments, cold-pressing of the abrasive forming mix may be carried out at a temperature of not greater than about 40° C., such as, not greater than about 38° C., not greater than about 36° C., not greater than about 34° C., not greater than about 32° C., not greater than about 30° C., not greater than about 28° C., not greater than about 26° C., not greater than about 24° C. or even not greater than about 22° C. It will be appreciated that cold-pressing of the abrasive forming mix may be carried out at any temperature within a range between any of the minimum and maximum values noted above. It will be further appreciated that cold-pressing of the abrasive forming mix may be carried out at any temperature between any of the minimum and maximum values noted above.

According to other embodiments, cold-pressing of the abrasive forming mix may be carried out at a pressure of at least about 0.1 tons/in$^2$, such as, 0.5 tons/in$^2$, at least about 1 ton/in$^t$, at least about 1.5 tons/in$^2$, at least about 2.0 tons/in$^2$, at least about 2.5 tons/in$^2$, at least about 3.0 tons/in$^2$ or even a least about 3.5 tons/in$^2$. In still other embodiments, cold-pressing of the abrasive forming mix may be carried out at a temperature of not greater than about 20 tons/in$^2$, not greater than about 15 tons/in$^2$, not greater than about 10 tons/in$^2$, not greater than about 5 tons/in$^2$, not greater than about 4.5 tons/in$^2$ or even not greater than about 4.0 tons/in$^2$. It will be appreciated that cold-pressing of the abrasive forming mix may be carried out at any pressure within a range between any of the minimum and maximum values noted above. It will be further appreciated that cold-pressing of the abrasive forming mix may be carried out at any pressure between any of the minimum and maximum values noted above.

Referring now to the abrasive article formed according to embodiments described herein, the abrasive article may include an organic bond material, abrasive particles within the organic bond material and a plasticizer within the organic bond material.

According to particular embodiments, the abrasive particles included in the abrasive article may include materials such as oxides, carbides, nitrides, borides, carbon-based materials (e.g., diamond), oxycarbides, oxynitrides, oxyborides, and a combination thereof. According to other embodiments, the abrasive particles can include a superabrasive material. According to still other embodiments, the abrasive particles may include a material selected from the group of silicon dioxide, silicon carbide, alumina, white alumina, zirconia, flint, garnet, emery, rare earth oxides, rare earth-containing materials, cerium oxide, sol-gel derived particles, gypsum, iron oxide, glass-containing particles, or combinations thereof. In another instance, abrasive particles may also include silicon carbide, brown fused alumina, seeded gel abrasive, sintered alumina with additives, shaped and sintered aluminum oxide, pink alumina, ruby alumina, electrofused monocrystalline alumina, alumina zirconia abrasives, extruded bauxite, sintered bauxite, cubic boron nitride, diamond, aluminum oxy-nitride, sintered alumina, extruded alumina, or any combination thereof. According to yet other embodiments, the abrasive particles consist essentially of silicon carbide. According to still other embodiments, the abrasive particles may have a Mohs hardness or at least 7, such as at least 8, or even at least 9.

According to particular embodiments, the abrasive particles included in the abrasive article may consist of materials such as oxides, carbides, nitrides, borides, carbon-based materials (e.g., diamond), oxycarbides, oxynitrides, oxyborides, and a combination thereof. According to other embodiments, the abrasive particles can consist of a superabrasive material. According to still other embodiments, the abrasive particles may consist of a material selected from the group of silicon dioxide, silicon carbide, alumina, white alumina, zirconia, flint, garnet, emery, rare earth oxides, rare earth-containing materials, cerium oxide, sol-gel derived particles, gypsum, iron oxide, glass-containing particles, or combinations thereof. In another instance, abrasive particles may consist of silicon carbide, brown fused alumina, seeded gel abrasive, sintered alumina with additives, shaped and sintered aluminum oxide, pink alumina, ruby alumina, electrofused monocrystalline alumina, alumina zirconia abrasives, extruded bauxite, sintered bauxite, cubic boron nitride, diamond, aluminum oxy-nitride, sintered alumina, extruded alumina, or any combination thereof.

According to yet other embodiments, the abrasive particles included in the abrasive article may include a coating, which may facilitate formation and performance of the abrasive article. In certain embodiments, the coating may be a metal coating, for example, nickel. According to still other embodiments, the coating may be iron oxide, a silane, such as, gamma amino propyl triethoxy silane, or even silica.

According to certain embodiments, the coating of the abrasive particles may have a specific thickness. For example, the average thickness of the coating of the abrasive particles can be at least about 1.25 microns, such as, at least about 1.5 microns, at least about 1.75 microns, at least about 2.0 microns, at least about 2.25 microns, at least about 2.5 microns, or at least about 3.0 microns. The average thickness can be limited, however, such as not greater than about 8.0 microns, not greater than about 7.5 microns, not greater than 7.0 microns, not greater than 6.5 microns, not greater than 6.0 microns, not greater than about 5.5 microns, not greater than 5.0 microns, not greater than about 4.5 microns, or not greater than 4.0 microns. It will be appreciated that the average thickness of the coating may be within a range between any of the minimum and maximum values noted above. It will be further appreciated that the average thickness of the coating may be any value between any of the minimum and maximum values noted above.

According to other embodiments, the coating of the abrasive particles can be formed to overlie a specific portion of the exterior surface of each abrasive particle. For example, the coating may overly at least about 50% of the exterior surface area of the abrasive particle, such as, at least about 60%, at least about 70%, at least about 80%, at least about 90%, even at least about 95%, or essentially the entire exterior surface of the abrasive particles. In still other embodiments, the coating may overly not greater than about 99% of the exterior surface area of the abrasive particle, such as, not greater than about 95%, not greater than about 90%, not greater than about 80%, not greater than about 70% or even not greater than about 60% of the exterior surface of the abrasive particles. It will be appreciated that the coating may overly any percent of the abrasive particle within a range between any of the minimum and maximum values noted above. It will be further appreciated that the coating may overly any percent of the surface of the abrasive particle between any of the minimum and maximum values noted above.

In further reference to the abrasive particles, according to certain embodiments, the morphology of the abrasive particles may be described by an aspect ratio, which is a ratio between the dimensions of length to width. It will be appreciated that the length is the longest dimension of the abrasive particle and the width is the second longest dimension of a given abrasive particle. In accordance with embodiments herein, the abrasive particles may have an aspect ratio (length:width) of not greater than about 10:1, such as, not greater than about 9:1, not greater than about 8:1, not greater than about 7:1, not greater than about 6:1, not greater than about 5:1, not greater than about 4:1, not greater than about 3:1, not greater than about 2:1 or even not greater than about 1.5:1. In particular instances, the abrasive particles may be essentially equiaxed, such that they have an aspect ratio of approximately 1:1.

According to still other embodiments, the abrasive particles may be shaped abrasive particles. According to yet other embodiments, the shaped abrasive particles may be regularly shaped or irregularly shaped abrasive particles.

According to still other embodiments, the abrasive article may include a particular content of abrasive particles. For example, the content of abrasive particles in the abrasive article may be at least about 60 wt. % for a total weight of the abrasive article, such as, at least about 63 wt. %, at least about 65 wt. %, at least about 68 wt. %, at least about 70 wt. %, at least about 73 wt. %, at least about 75 wt. %, at least about 78 wt. %, at least about 80 wt. %, at least about 83 wt. %, at least about 85 wt. % or even at least about 88 wt. %. According to still other embodiments, the content of abrasive particles in the abrasive article may be not greater than about 98 wt. % for a total weight of the abrasive article, such as, not greater than about 95 wt. %, not greater than about 92 wt. %, not greater than about 90 wt. %, not greater than about 87 wt. %, not greater than about 85 wt. %, not greater than about 82 wt. %, not greater than about 80 wt. %, not greater than about 77 wt. %, not greater than about 75 wt. %, not greater than about 72 wt. % or even not greater than about 70 wt. %. It will be appreciated that the content of abrasive particles in the abrasive article may be within a range between any of the minimum and maximum values noted above. It will be further appreciated that the content of abrasive particles in the abrasive article may be any value between any of the minimum and maximum values noted above.

According to still other embodiments, the abrasive article may include a particular content of bond material. For example, the content of bond material in the abrasive article may be at least about 2 wt. % for a total weight of the abrasive article, such as, at least about 5 wt. %, at least about 7 wt. %, at least about 10 wt. %, at least about 12 wt. %, at least about 15 wt. %, at least about 17 wt. % or at least about 20 wt. %. According to still other embodiments, the content of bond material in the mixture may be not greater than about 30 wt. % for a total weight of the abrasive article, such as, not greater than about 27 wt. %, not greater than about 25 wt. %, not greater than about 22 wt. %, not greater than about 20 wt. %, not greater than about 17 wt. %, not greater than about 15 wt. % or even not greater than about 12 wt. %. It will be appreciated that the content of bond material in the abrasive article may be within a range between any of the minimum and maximum values noted above. It will be further appreciated that the content of bond material in the abrasive article may be any value between any of the minimum and maximum values noted above.

According to particular embodiments, the bond material may be an organic bond material.

According to yet other embodiments, the abrasive article may include a particular content of organic bond material. For example, the content of organic bond material in the abrasive article may be at least about 2 wt. % for a total weight of the abrasive article, such as, at least about 5 wt. %, at least about 7 wt. %, at least about 10 wt. %, at least about 12 wt. %, at least about 14 wt. %, at least about 16 wt. % or even at least about 18 wt. %. According to still other embodiments, the content of organic bond material in the abrasive article may be not greater than about 30 wt. % for a total weight of the abrasive article, such as, not greater than about 27 wt. %, not greater than about 25 wt. %, not greater than about 22 wt. %, not greater than about 20 wt. %, not greater than about 17 wt. %, not greater than about 15 wt. %, not greater than about 12 wt. %, not greater than about 10 wt. %, not greater than about 7 wt. % or even not greater than about 5 wt. %. It will be appreciated that the content of organic bond material in the abrasive article may be within a range between any of the minimum and maximum values noted above. It will be further appreciated that the content of organic bond material in the abrasive article may be any value between any of the minimum and maximum values noted above.

According to yet other embodiments, the organic bond material in the bond material composite may be any suitable organic bond material for use in an abrasive article. According to certain embodiments, the organic bond material may be a resin bond material. According to still other embodiments, the organic bond material may be thermoset organic bond materials or thermoplastic organic bond materials. According to still other embodiments, the organic bond material may include suitable organic bond materials for abrasive articles, such as, phenolics, epoxies, polyimides, polyamides, resins, aramids, epoxies, polyesters, polyurethanes, polybenzimidazoles, cyanate esters, polybenzoxazines, shellac, cork, rubber or any combinations thereof. According to yet another embodiment, the organic bond material may include rubber. According to still other embodiments, the organic bond material may include shellac. Additionally, the organic bond material may include some content of resin material. According to still other embodiments, the organic bond material may include a phenolic resin. According to still other embodiments, the organic bond material may consist of a phenolic resin.

According to particular embodiments, the organic bond material in the abrasive article may include a phenolic resin. According to still other embodiments, the organic bond material in the abrasive article may include a particular content of phenolic resin. For example, the content of phenolic resin in the organic bond material may at least about 50 wt. % for a total weight of the organic bond material, such as, at least about 55 wt. %, at least about 60 wt. %, at least about 65 wt. %, at least about 70 wt. %, at least about 75 wt. %, at least about 80 wt. %, at least about 85 wt. %, at least about 90 wt. %, at least about 95 wt. % or even at least about 98 wt. %. According to still other embodiments, the organic bond material may consist essentially of phenolic resin. According to yet other embodiments, the content of phenolic resin in the organic bond material may be not greater than about 99 wt. % for a total weight of the organic bond material, such as, not greater than about 95 wt. %, not greater than about 90 wt. %, not greater than about 85 wt. %, not greater than about 80 wt. %, not greater than about 75 wt. %, not greater than about 70 wt. %, not greater than about 65 wt. %, not greater than about 60 wt. % or even not greater than about 55 wt. %. It will be appreciated that the content of phenolic resin in the bond material may be within a range between any of the minimum and maximum values noted above. It will be appreciated that the content of phenolic resin in the bond material may be any value between any of the minimum and maximum values noted above.

According to yet other embodiments, the abrasive article may include a particular content of phenolic resin. For example, the content of phenolic resin in the abrasive article may be at least about 2 wt. % for a total weight of the abrasive article, such as, at least about 5 wt. %, at least about 7 wt. %, at least about 10 wt. %, at least about 12 wt. %, at least about 14 wt. %, at least about 16 wt. % or even at least about 18 wt. %. According to still other embodiments, the content of phenolic resin in the abrasive article may be not greater than about 20 wt. % for a total weight of the abrasive article, such as, not greater than about 17 wt. %, not greater than about 15 wt. %, not greater than about 12 wt. %, not greater than about 10 wt. %, not greater than about 7 wt. % or even not greater than about 5 wt. %. It will be appreciated that the content of phenolic resin in the abrasive article may be within a range between any of the minimum and maximum values noted above. It will be further appreciated that the content of phenolic resin in the abrasive article may be any value between any of the minimum and maximum values noted above.

According to still other embodiments, the abrasive article may further include a filler material. According to particular embodiments, the abrasive article may include a particular content of filler material. For example, the content of filler material in the abrasive article may be at least about 4 wt. % for a total weight of the abrasive article, such as, at least about 6 wt. %, at least about 8 wt. %, at least about 10 wt. %, at least about 12 wt. %, at least about 14 wt. %, at least about 16 wt. % or even at least about 18 wt. %. According to still other embodiments, the content of filler material in the abrasive article may be not greater than about 50 wt. % for a total weight of the abrasive article, such as, not greater than about 47 wt. %, not greater than about 45 wt. %, not greater than about 42 wt. %, not greater than about 40 wt. %, not greater than about 37 wt. %, not greater than about 35 wt. %, not greater than about 32 wt. %, not greater than about 30 wt. %, not greater than about 27 wt. %, not greater than about 25 wt. %, not greater than about 22 wt. % or even not greater than about 20 wt. %. It will be appreciated that the content of filler material in the abrasive article may be within a range between any of the minimum and maximum values noted above. It will be further appreciated that the content of filler material in the abrasive article may be any value between any of the minimum and maximum values noted above.

According to still other embodiments, the filler materials may include particular fillers. According to certain embodiments, the fillers may include any material selected from the group consisting of powders, granules, spheres, fibers, and a combination thereof. Moreover, in particular instances, the fillers can include an inorganic material, an organic material, fibers, woven materials, non-woven materials, particles, minerals, nuts, shells, oxides, alumina, carbide, nitrides, borides, polymeric materials, naturally occurring materials, and a combination thereof. In a certain embodiment, the fillers can include a material such as sand, bubble alumina, chromites, magnesite, dolomites, bubble mullite, borides, titanium dioxide, carbon products (e.g., carbon black, coke or graphite), silicon carbide, wood flour, clay, talc, hexagonal boron nitride, molybdenum disulfide, feldspar, glass spheres, glass fibers, chlorine containing fillers, potassium chloride, complex salts of manganese, potassium, chloride, $CaF_2$, Cryolite ($Na_3AlF_6$), potassium Cryolite ($K_3AlF_6$), pyrites, ZnS, copper sulfide, mineral oil, fluorides, carbonates, calcium carbonate, wollastonite, mullite, steel, iron, copper, brass, bronze, tin, aluminum, kyanite, alusite, garnet, quartz, fluoride, mica, nepheline syenite, sulfates (e.g., barium sulfate), carbonates (e.g., calcium carbonate), titanates (e.g., potassium titanate fibers), rock wool, clay, sepiolite, iron sulfide (e.g., $Fe_2S_3$, $FeS_2$, or a combination thereof), potassium fluoroborate ($KBF_4$), zinc borate, borax, boric acid, fine alundum powders, P15A, cork, glass spheres, silica microspheres (Z-light), silver, Saran™ resin, paradichlorobenzene, oxalic acid, alkali halides, organic halides, attapulgite or any combination thereof.

According to yet other embodiments, the abrasive article may include a plasticizer having particular characteristic. For example, the plasticizer may have at least one of an aromatic phenyl group, a heteroaromatic furyl group, or a saturated aliphatic hydrocarbon. According to still other embodiments, the plasticizer may have an aromatic phenyl group, a heteroaromatic furyl group, or a saturated aliphatic hydrocarbon. According to another embodiment, the plasticizer may have at least one polar group.

According to yet other embodiments, when the plasticizer is a saturated aliphatic hydrocarbon, the saturated aliphatic hydrocarbon may be a low viscosity saturated aliphatic hydrocarbon.

According to still other embodiments, the low viscosity saturated aliphatic hydrocarbon may have a particular chain length. For example, the low viscosity saturated aliphatic hydrocarbon may have a chain length of at least about 10 carbon atoms, such as, at least about 12 carbon atoms, at least about 14 carbon atoms, at least about 16 carbon atoms, at least about 18 carbon atoms or even at least about 20 carbon atoms. According to still other embodiments, the low viscosity saturated aliphatic hydrocarbon may have a chain length of not greater than about 40 carbon atoms, such as, not greater than about 38 carbon atoms, not greater than about 36 v, not greater than about 34 carbon atoms, not greater than about 32 carbon atoms or even not greater than about 30 carbon atoms. It will be appreciated that the low viscosity saturated aliphatic hydrocarbon may have a chain length within a range between any of the minimum and maximum values noted above. It will be further appreciated that the low viscosity saturated aliphatic hydrocarbon may have a chain length of any value between any of the minimum and maximum values noted above. According to yet another embodiment, the plasticizer may include a functional group selected from the group consisting of an aldehyde, a ketone, an ester, an ether, an alcohol, an amine, an amide and combinations thereof. According to yet another embodiment, the plasticizer may consist of a functional group selected from the group consisting of an aldehyde, a ketone, an ester, an ether, an alcohol, an amine, an amide and combinations thereof.

According to still other embodiments, the abrasive article may have a particular crosslinking density factor. The crosslinking density factor is defined as the percent increase of the Low Field NMR (LFNMR) signal of an abrasive article formed with a plasticizer as described herein as compared to the LFNMR signal of an abrasive article formed without the plasticizer. The crosslinking density factor may be calculated based on the equation $((AAP_{LFNMR} - AA_{LFNMR})/AA_{LFNMR})*100$, where $AAP_{LFNMR}$ is equal to the T1 relaxation time of the abrasive article formed from an abrasive forming mix with the plasticizer and $AA_{LFNMR}$ is equal to the T1 relaxation time of an abrasive article formed from an identical abrasive forming mix without a plasticizer. The T1 relaxation times are measured using low field NMR at 50° C. According to particular embodiments, the abrasive article may have a crosslinking density factor of at least about 10, such as, at least about 20, at least about 30, at least about 40, at least about 50, at least about 52, at least about 55, at least about 57, at least about 60, at least about 62, at least about 65 or even at least about 67. According to yet other embodiments, the abrasive article may have a crosslinking density factor of not greater than about 300, such as, not greater than about 250 or even not greater than about 200. It will be appreciated that the abrasive article may have a crosslinking density factor of any of the minimum or maximum values noted above. It will be further appreciated that the abrasive article may have a crosslinking density factor of any value between any of the minimum and maximum values noted above.

According to yet another embodiment, the plasticizer may have a particular boiling point as measured according to ASTM E1719-12. For example, the plasticizer may have a boiling point of at least about 180° C., such as, at least about 200° C., at least about 220° C., at least about 240° C., at least about 260° C., at least about 280° C., at least about 300° C., at least about 320° C. or even at least about 340° C. According to still other embodiments, the plasticizer may have a boiling point of not greater than about 500° C., such as, not greater than about 490° C., not greater than about 480° C., not greater than about 470° C., not greater than about 460° C. or even not greater than about 450° C. It will be appreciated that the plasticizer may have a boiling point within a range between any of the minimum and maximum values noted above. It will be further appreciated that the plasticizer may have a boiling point of any value between any of the minimum and maximum values noted above.

According yet another embodiment, the plasticizer may have a particular vapor pressure as measured at a temperature of 20° C. according to ASTM D2879-10. For example, the plasticizer may have a vapor pressure of not greater than about 267 pascals, such as, not greater than about 260 pascals, not greater than about 250 pascals, not greater than about 240 pascals, not greater than about 230 pascals, not greater than about 220 pascals, not greater than about 210 pascals, not greater than about 200 pascals, not greater than about 150 pascals, not greater than about 100 pascals or even not greater than about 50 pascals. According to yet another embodiment, the plasticizer may have a vapor pressure of at least about 0.2 pascals such as, at least about 1 pascals, at least about 5 pascals, at least about 10 pascals or even at least about 25 pascals. It will be appreciated that the plasticizer may have a vapor pressure within a range between any of the minimum and maximum values noted above. It will be further appreciated that the plasticizer may have a vapor pressure of any value between any of the minimum and maximum values noted above.

According to yet another embodiment, the plasticizer may be liquid at room temperature. According to still another embodiment, the plasticizer may be a liquid at a temperature of 25° C.

According to still other embodiments, the plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldehyde, o-tolualdehyde, salicylaldehyde, p-tolualdehyde, and combinations thereof.

According to still other embodiments, the plasticizer may consist of a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldehyde, o-tolualdehyde, salicylaldehyde, p-tolualdehyde, and combinations thereof.

According to yet other embodiments, the abrasive article may include a particular content of plasticizer. For example, the content of plasticizer in the abrasive article may be not greater than about 5 wt. % for a total weight of the abrasive article, such as, not greater than about 4.5 wt. %, not greater than about 4.0 wt. %, not greater than about 3.5 wt. %, not greater than about 3.0 wt. %, not greater than about 2.5 wt. %, not greater than about 2.0 wt. %, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. % or even not greater than about 1 wt. %. According to still other embodiments, the content of plasticizer in the abrasive article may at least about 0.001 wt. %, such as, at least about 0.01 wt. % or even at least about 0.1 wt. %. It will be appreciated that the content of plasticizer in the abrasive article may be within a range between any of the minimum and maximum values noted above. It will be further appreciated that the content of plasticizer in the abrasive article may be any value between any of the minimum and maximum values noted above.

According to yet another embodiment, the abrasive article may include a particular ratio $AAC_{PL}/AAC_{OBM}$, where $AAC_{PL}$ is the content of plasticizer in weight percent for a total weight of the abrasive article and $AAC_{OBM}$ is the content of organic bond material in weight percent for a total weight of the abrasive article. For example, the ratio $AAC_{PL}/AAC_{OBM}$ may be not greater than about 0.25, such as, not greater than about 0.2, not greater than about 0.15, not greater than about 0.1 or even not greater than about 0.05. According to still other embodiments, the ratio $AAC_{PL}/AAC_{OBM}$ may be at least about 0.001, such as, at least about 0.01, at least about 0.02, at least about 0.03 or even at least about 0.04. It will be appreciated that the ratio $AAC_{PL}/AAC_{OBM}$ may be within a range between any of the minimum and maximum values noted above. It will be further appreciated that ratio $AAC_{PL}/AAC_{OBM}$ may be any value between any of the minimum and maximum values noted above.

According to still other embodiments, the abrasive article may include a particular ratio $AAC_{PL}/AAC_{AP}$, where $AAC_{PL}$ represents the content of plasticizer in the abrasive article in wt. % for a total weight of the abrasive article and $AAC_{AP}$ represents the content of abrasive particles in the abrasive article in wt. % for a total weight of the abrasive article. For example, the ratio $AAC_{PL}/AAC_{AP}$ may be at least about 0.001, such as, at least about 0.002, at least about 0.003, at least about 0.004 or even at least about 0.005. According to still other embodiments, the ratio $AAC_{PL}/AAC_{AP}$ may be not greater than about 0.3, such as, not greater than about not greater than about 0.25, not greater than about 0.20, not greater than about 0.15 or even not greater than about 0.1. It will be appreciated that the ratio $AAC_{PL}/AAC_{AP}$ may be within a range between any of the minimum and maximum values noted above. It will be further appreciated that ratio $AAC_{PL}/AAC_{AP}$ may be any value between any of the minimum and maximum values noted above.

According to yet other embodiments, the abrasive article may include multiple plasticizers. For example, the abrasive article may include a first plasticizer and a second plasticizer. According to particular embodiments, the first plasticizer may be distinct from the second plasticizer.

According to yet other embodiments, the first plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde or combinations thereof.

According to still other embodiments, the second plasticizer may include a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde or combinations thereof.

According to yet other embodiments, the abrasive article may include a particular plasticizer ratio $AAC_{PL1}/AAC_{PL2}$, where $AAC_{PL1}$ is equal to the content of the first plasticizer in the abrasive article and $AAC_{PL2}$ is equal to the content of the second plasticizer in the abrasive article. For example, the abrasive article may include a plasticizer ratio $AAC_{PL1}/AAC_{PL2}$ of at least about 0.2, such as, at least about 0.23, at least about 0.25, at least about 0.28, at least about 0.3, at least about 0.33 or even at least about 0.35. According to still other embodiments, the abrasive article may include a plasticizer ratio $AAC_{PL1}/AAC_{PL2}$ of not greater than about 0.8, such as, not greater than about 0.78, not greater than about 0.75, not greater than about 0.73, not greater than about 0.70, not greater than about 0.68, not greater than about 0.65, not greater than about 0.63, not greater than about 0.6, not greater than about 0.58, not greater than about 0.55 or even not greater than about 0.53. It will be appreciated that the plasticizer ratio $FMC_{PL1}/FMC_{PL2}$ may be within a range between any of the minimum and maximum values noted above. It will be further appreciated that the plasticizer ratio $FMC_{PL1}/FMC_{PL2}$ may be any value between any of the minimum and maximum values noted above.

According to yet other embodiments, the abrasive article may include a particular combined content of the first plasticizer in the abrasive article and the second plasticizer in the abrasive article. For example, the combined content of the first plasticizer in the abrasive article and the second plasticizer in the abrasive article may be not greater than 5 wt. % for a total weight of the abrasive article, such as, not greater than about 4.5 wt. %, not greater than about 4.0 wt. %, not greater than about 3.5 wt. %, not greater than about 3.0 wt. %, not greater than about 2.5 wt. %, not greater than about 2.0 wt. %, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. % or even not greater than about 1 wt. %. According to other embodiments, the abrasive article may include a combined content of the first plasticizer in the abrasive article and the second plasticizer in the abrasive article of at least about 0.001 wt. % for a total weight of the abrasive article, such as, at least about 0.01 wt. % or even at least about 0.1 wt. %. It will be appreciated that the combined content of the first plasticizer in the abrasive article and the second plasticizer in the abrasive article may be within a range between any of the minimum and maximum values noted above. It will be further appreciated that the combined content of the first plasticizer in the abrasive article and the second plasticizer in the abrasive article may be any value between any of the minimum and maximum values noted above.

According to other embodiments, the abrasive article may include a particular content of the first plasticizer. For example, the content of the first plasticizer in the abrasive article may be not greater than 2.5 wt. % for a total weight of the abrasive article, such as, not greater than about 2.0 wt. %, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. % or even not greater than about 1 wt. %. According to still other embodiments, the content of the first plasticizer in the abrasive article may be at least about 0.001 wt. % for a total weight of the abrasive article, such as, at least about 0.01 wt. % or even at least about 0.1 wt. %. It will be appreciated that the content of the first plasticizer in the abrasive article may be within a range between any of the minimum and maximum values noted above. It will be further appreciated that the content of the first plasticizer in the abrasive article may be any value between any of the minimum and maximum values noted above.

According to still other embodiments, the abrasive article may include a particular content of the second plasticizer. For example the content of the second plasticizer in the abrasive article may be not greater than 5 wt. % for a total weight of the abrasive article, such as, not greater than about 4.5 wt. %, not greater than about 4.0 wt. %, not greater than about 3.5 wt. %, not greater than about 3.0 wt. %, not greater than about 2.5 wt. %, not greater than about 2.0 wt. %, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. % or even not greater than about 1 wt. %. According to yet other embodiments, the content of the second plasticizer in the abrasive article may be at least about 0.001 wt. % for a total weight of the abrasive article, such as, at least about 0.01 wt. % or even at least about 0.1 wt. %. It will be appreciated that the content of the second plasticizer in the abrasive article may be within a range between any of the minimum and maximum values noted above. It will be further appreciated that the content of the second plasticizer in the abrasive article may be any value between any of the minimum and maximum values noted above.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one of more of the embodiments as listed below.

Embodiment 1

An abrasive article comprising: an organic bond material; abrasive particles contained within the organic bond material; and a plasticizer contained within the organic bond material, wherein the plasticizer comprises at least one of an aromatic phenyl group, a heteroaromatic furyl group, or a saturated aliphatic hydrocarbon, and wherein the plasticizer comprises at least one polar group.

Embodiment 2

An abrasive article comprising: an organic bond material; abrasive particles contained within the organic bond material; and a plasticizer contained within the organic bond material, wherein the abrasive article has a crosslinking density factor of at least about 10.3

Embodiment 3

An abrasive article comprising: an organic bond material; abrasive particles contained within the organic bond material; and a plasticizer contained within the organic bond material, wherein a content of the plasticizer in the abrasive article is not greater than 5 wt. % for a total weight of the abrasive article, and wherein the plasticizer comprises a boiling point of at least about 180° C.

Embodiment 4

An abrasive article comprising: an organic bond material; abrasive particles contained within the organic bond material; and a plasticizer contained within the organic bond material, wherein a content of the plasticizer in the abrasive article is not greater than 5 wt. % for a total weight of the abrasive article, and wherein the plasticizer comprises a vapor pressure of not greater than about 267 pascals as measured at a temperature of 20° C.

Embodiment 5

An abrasive article comprising: an organic bond material; abrasive particles contained within the organic bond material; a plasticizer contained within the organic bond material; and a ratio $AAC_{PL}/AAC_{OBM}$ of not greater than about 0.25, where $AAC_{PL}$ is the content of plasticizer in weight percent for a total weight of the abrasive article and $AAC_{OBM}$ is the content of organic bond material in weight percent for a total weight of the abrasive article.

Embodiment 6

An abrasive article comprising: an organic bond material; abrasive particles contained within the organic bond material; and a plasticizer contained within the organic bond material, wherein a content of the plasticizer in the abrasive article is not greater than 5 wt. % for a total weight of the abrasive article, and wherein the plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldehyde, o-tolualdehyde, salicylaldehyde, p-tolualdehyde, and combinations thereof.

Embodiment 7

An abrasive forming mix comprising: an organic bond material; abrasive particles; and a plasticizer, wherein the plasticizer comprises at least one of an aromatic phenyl group, a heteroaromatic furyl group, or a saturated aliphatic hydrocarbon, and wherein the plasticizer comprises at least one polar group.

Embodiment 8

An abrasive forming mix comprising: an organic bond material; abrasive particles; and a plasticizer, wherein the abrasive article has a crosslinking density factor of at least about 10.

Embodiment 9

An abrasive forming mix comprising: an organic bond material; abrasive particles; and a plasticizer, wherein a content of the plasticizer in the abrasive article is not greater than 5 wt. % for a total weight of the abrasive forming mix, and wherein the plasticizer comprises a boiling point of at least about 180° C.

Embodiment 10

An abrasive forming mix comprising: an organic bond material; abrasive particles; and a plasticizer, wherein a content of the plasticizer in the abrasive article is not greater than 5 wt. % for a total weight of the abrasive forming mix, and wherein the plasticizer comprises a vapor pressure of not greater than about 267 pascals as measured at a temperature of 20° C.

Embodiment 11

An abrasive forming mix comprising: an organic bond material; abrasive particles; a plasticizer; and a forming mix plasticizer ratio $FMC_{PL}/FMC_{OBM}$ of not greater than about 0.25, where $FMC_{PL}$ is the content of plasticizer in weight percent for a total weight of the abrasive forming mix and $FMC_{OBM}$ is the content of organic bond material in weight percent for a total weight of the abrasive forming mix.

Embodiment 12

An abrasive forming mix comprising: an organic bond material; abrasive particles; and a plasticizer, wherein a content of the plasticizer in the abrasive forming mix is not greater than 5 wt. % for a total weight of the abrasive forming mix, and wherein the plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof.

Embodiment 13

A method of forming an abrasive article, wherein the method comprises: providing an abrasive forming mix comprising: an organic bond material, abrasive particles, and a plasticizer, wherein the plasticizer comprises at least one of an aromatic phenyl group, a heteroaromatic furyl group, or a saturated aliphatic hydrocarbon, and wherein the plasticizer comprises at least one polar group; and forming the abrasive forming mix into an abrasive article.

Embodiment 14

A method of forming an abrasive article, wherein the method comprises: providing an abrasive forming mix comprising: an organic bond material, abrasive particles, and a plasticizer; and forming the abrasive forming mix into an abrasive article, wherein the abrasive article has a crosslinking density factor of at least about 10.

Embodiment 15

A method of forming an abrasive article, wherein the method comprises: providing an abrasive forming mix comprising: an organic bond material, abrasive particles, and a plasticizer, wherein a content of the plasticizer in the abrasive article is not greater than 5 wt. % for a total weight of the abrasive forming mix and wherein the plasticizer comprises a boiling point of at least about 180° C.; and forming the abrasive forming mix into an abrasive article.

Embodiment 16

A method of forming an abrasive article, wherein the method comprises: providing an abrasive forming mix comprising: an organic bond material, abrasive particles, and a plasticizer, wherein a content of the plasticizer in the abrasive article is not greater than 5 wt. % for a total weight of the abrasive forming mix and wherein the plasticizer comprises a vapor pressure of not greater than about 267 pascals as measured at a temperature of 20° C.; and forming the abrasive forming mix into an abrasive article.

Embodiment 17

A method of forming an abrasive article, wherein the method comprises: providing an abrasive forming mix comprising: an organic bond material, abrasive particles, a plasticizer, and a forming mix plasticizer ratio $FMC_{PL}/FMC_{OBM}$ of not greater than about 0.25, where $FMC_{PL}$ is the content of plasticizer in weight percent for a total weight of the abrasive forming mix and $FMC_{OBM}$ is the content of organic bond material in weight percent for a total weight of the abrasive forming mix; and forming the abrasive forming mix into an abrasive article.

Embodiment 18

A method of forming an abrasive article, wherein the method comprises: providing an abrasive forming mix comprising: an organic bond material, abrasive particles, and a plasticizer, wherein a content of the plasticizer in the abrasive article is not greater than 5 wt. % for a total weight of the abrasive forming mix and wherein the plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof; and forming the abrasive forming mix into an abrasive article.

Embodiment 19

A method of forming an abrasive article, wherein the method comprises: providing an abrasive forming mix; and forming the abrasive forming mix into an abrasive article, wherein the abrasive article comprises: an organic bond material, abrasive particles, and a plasticizer, wherein the plasticizer comprises at least one of an aromatic phenyl group, a heteroaromatic furyl group, or a saturated aliphatic hydrocarbon, and wherein the plasticizer comprises at least one polar group.

Embodiment 20

A method of forming an abrasive article, wherein the method comprises: providing an abrasive forming mix; and forming the abrasive forming mix into an abrasive article, wherein the abrasive article comprises: an organic bond material; abrasive particles; and an abrasive article, wherein the abrasive article has a crosslinking density factor of at least about 10.

Embodiment 21

A method of forming an abrasive article, wherein the method comprises: providing an abrasive forming mix; and forming the abrasive forming mix into an abrasive article, wherein the abrasive article comprises: an organic bond material, abrasive particles, and a plasticizer, wherein a content of the plasticizer in the abrasive article is not greater than 5 wt. % for a total weight of the abrasive article and wherein the plasticizer comprises a boiling point of at least about 180° C.

Embodiment 22

A method of forming an abrasive article, wherein the method comprises: providing an abrasive forming mix; and forming the abrasive forming mix into an abrasive article, wherein the abrasive article comprises: an organic bond material, abrasive particles, and a plasticizer, wherein a content of the plasticizer in the abrasive article is not greater than 5 wt. % for a total weight of the abrasive article and wherein the plasticizer comprises a vapor pressure of not greater than about 267 pascals as measured at a temperature of 20° C.

Embodiment 23

A method of forming an abrasive article, wherein the method comprises: providing an abrasive forming mix; and forming the abrasive forming mix into an abrasive article, wherein the abrasive article comprises: an organic bond material, abrasive particles, a plasticizer, and a ratio $AAC_{PL}/AAC_{OBM}$ of not greater than about 0.25, where $AAC_{PL}$ is the content of plasticizer in weight percent for a total weight of the abrasive article and $AAC_{OBM}$ is the content of organic bond material in weight percent for a total weight of the abrasive article.

Embodiment 24

A method of forming an abrasive article, wherein the method comprises: providing an abrasive forming mix; and forming the abrasive forming mix into an abrasive article, wherein the abrasive article comprises: an organic bond material, abrasive particles, and a plasticizer, wherein a content of the plasticizer in the abrasive article is not greater than 5 wt. % for a total weight of the abrasive article and wherein the plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof.

Embodiment 25

The abrasive article, abrasive forming mix or method of any one of the previous embodiments, wherein the abrasive article further comprises a crosslinking density of at least about 10.

Embodiment 26

The abrasive article, abrasive forming mix or method of any one of the previous embodiments, wherein the abrasive article further comprises a cross linking density of not greater than about 300.

Embodiment 27

The abrasive article, abrasive forming mix or method of any one of the previous embodiments, wherein the plasticizer further comprises a boiling point of at least about 180° C.

Embodiment 28

The abrasive article, abrasive forming mix or method of any one of the previous embodiments, wherein the plasticizer further comprises a boiling point of not greater than about 500° C.

Embodiment 29

The abrasive article, abrasive forming mix or method of any one of the previous embodiments, wherein the plasticizer further comprises a vapor pressure of not greater than about 267 pascals as measured at a temperature of 20° C.

Embodiment 30

The abrasive article, abrasive forming mix or method of any one of the previous embodiments, wherein the plasticizer further comprises a vapor pressure of at least about 0.267 pascals as measured at a temperature of 20° C.

Embodiment 31

The abrasive article or method of any one of embodiments 1, 2, 3, 4, 5, 6, 13, 14, 15, 16, 17, 18, 19, 20, 21, 22, 23 and 24, wherein the abrasive article further comprises an a ratio $AAP_C/AAB_C$ of not greater than about 0.25.

Embodiment 32

The abrasive article or method of any one of embodiments 1, 2, 3, 4, 5, 6, 13, 14, 15, 16, 17, 18, 19, 20, 21, 22, 23 and 24, wherein the abrasive article further comprises a ratio $AAP_C/AAB_C$ of at least about 0.001.

Embodiment 33

The abrasive forming mix or method of any one of embodiments 7, 8, 9, 10, 11, 12, 13, 14, 15, 16, 17, 18, 19, 20, 21, 22, 23 and 24, wherein the forming mix further comprises a ratio $FMP_C/FMB_C$ of not greater than about 0.25.

Embodiment 34

The abrasive forming mix or method of any one of embodiments 7, 8, 9, 10, 11, 12, 13, 14, 15, 16, 17, 18, 19, 20, 21, 22, 23 and 24, wherein the forming mix further comprises a ratio $FMP_C/FMB_C$ of at least about 0.001.

Embodiment 35

The abrasive article, abrasive forming mix or method of any one of the previous embodiments, wherein the plasticizer is liquid at room temperature.

Embodiment 36

The abrasive article, abrasive forming mix or method of any one of the previous embodiments, wherein the plasticizer comprises an aromatic phenyl group, a heteroaromatic furyl group, or a saturated aliphatic hydrocarbon.

Embodiment 37

The abrasive article, abrasive forming mix or method of any one of the previous embodiments, wherein the plasticizer comprises at least one functional group selected from the group consisting of an aldehyde, a ketone, an ester, an ether, an alcohol, an amine, an amide and combinations thereof.

Embodiment 38

The abrasive article, abrasive forming mix or method of any one of the previous embodiments, wherein the plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof.

Embodiment 39

The abrasive article or method of any one of embodiments 1, 2, 3, 4, 5, 6, 13, 14, 15, 16, 17, 18, 19, 20, 21, 22, 23 and 24, wherein the abrasive article further comprises a filler material.

Embodiment 40

The abrasive article or method of embodiment 39, wherein the filler material may comprise sand, bubble alumina, chromites, magnesite, dolomites, bubble mullite, borides, titanium dioxide, carbon products (e.g., carbon black, coke or graphite), silicon carbide, wood flour, clay, talc, hexagonal boron nitride, molybdenum disulfide, feldspar, glass spheres, glass fibers, chlorine containing fillers, potassium chloride, complex salts of manganese, potassium, chloride, $CaF_2$, Cryolite ($Na_3AlF_6$), potassium Cryolite ($K_3AlF_6$), pyrites, ZnS, copper sulfide, mineral oil, fluorides, carbonates, calcium carbonate, wollastonite, mullite, steel, iron, copper, brass, bronze, tin, aluminum, kyanite, alusite, garnet, quartz, fluoride, mica, nepheline syenite, sulfates (e.g., barium sulfate), carbonates (e.g., calcium carbonate), titanates (e.g., potassium titanate fibers), rock wool, clay, sepiolite, iron sulfide (e.g., $Fe_2S_3$, $FeS_2$, or a combination thereof), potassium fluoroborate ($KBF_4$), zinc borate, borax, boric acid, fine alundum powders, P15A, cork, glass spheres, silica microspheres (Z-light), silver, Saran™ resin, paradichlorobenzene, oxalic acid, alkali halides, organic halides, attapulgite and combinations thereof.

Embodiment 41

The abrasive article or method of embodiment 39, wherein the filler material may consist of sand, bubble alumina, chromites, magnesite, dolomites, bubble mullite, borides, titanium dioxide, carbon products (e.g., carbon black, coke or graphite), silicon carbide, wood flour, clay, talc, hexagonal boron nitride, molybdenum disulfide, feldspar, glass spheres, glass fibers, chlorine containing fillers, potassium chloride, complex salts of manganese, potassium, chloride, $CaF_2$, Cryolite ($Na_3AlF_6$), potassium Cryolite ($K_3AlF_6$), pyrites, ZnS, copper sulfide, mineral oil, fluorides, carbonates, calcium carbonate, wollastonite, mullite, steel, iron, copper, brass, bronze, tin, aluminum, kyanite, alusite, garnet, quartz, fluoride, mica, nepheline syenite, sulfates (e.g., barium sulfate), carbonates (e.g., calcium carbonate), titanates (e.g., potassium titanate fibers), rock wool, clay, sepiolite, iron sulfide (e.g., $Fe_2S_3$, $FeS_2$, or a combination thereof), potassium fluoroborate ($KBF_4$), zinc borate, borax, boric acid, fine alundum powders, P15A, cork, glass spheres, silica microspheres (Z-light), silver, Saran™ resin, paradichlorobenzene, oxalic acid, alkali halides, organic halides, attapulgite or any combination thereof.

Embodiment 42

The abrasive article or method of embodiment 39, wherein the abrasive article comprises a filler material content of at least about 4 wt. % for a total weight of the abrasive article.

Embodiment 43

The abrasive article or method of embodiment 39, wherein the abrasive article comprises a filler material content of not greater than about 50 wt. % for a total weight of the abrasive article.

Embodiment 44

The abrasive forming mix or method of any one of embodiments 7, 8, 9, 10, 11, 12, 13, 14, 15, 16, 17, 18, 19, 20, 21, 22, 23 and 24, wherein the abrasive forming mix further comprises a filler material.

Embodiment 45

The abrasive forming mix or method of embodiment 44, wherein the filler material may comprise sand, bubble alumina, chromites, magnesite, dolomites, bubble mullite, borides, titanium dioxide, carbon products (e.g., carbon black, coke or graphite), silicon carbide, wood flour, clay, talc, hexagonal boron nitride, molybdenum disulfide, feldspar, glass spheres, glass fibers, chlorine containing fillers, potassium chloride, complex salts of manganese, potassium, chloride, $CaF_2$, Cryolite ($Na_3AlF_6$), potassium Cryolite ($K_3AlF_6$), pyrites, ZnS, copper sulfide, mineral oil, fluorides, carbonates, calcium carbonate, wollastonite, mullite, steel, iron, copper, brass, bronze, tin, aluminum, kyanite, alusite, garnet, quartz, fluoride, mica, nepheline syenite, sulfates (e.g., barium sulfate), carbonates (e.g., calcium carbonate), titanates (e.g., potassium titanate fibers), rock wool, clay, sepiolite, iron sulfide (e.g., $Fe_2S_3$, $FeS_2$, or a combination thereof), potassium fluoroborate ($KBF_4$), zinc borate, borax, boric acid, fine alundum powders, P15A, cork, glass spheres, silica microspheres (Z-light), silver, Saran™ resin, paradichlorobenzene, oxalic acid, alkali halides, organic halides, attapulgite and combinations thereof.

Embodiment 46

The abrasive forming mix or method of embodiment 44, wherein the filler material may consist of sand, bubble alumina, chromites, magnesite, dolomites, bubble mullite, borides, titanium dioxide, carbon products (e.g., carbon black, coke or graphite), silicon carbide, wood flour, clay, talc, hexagonal boron nitride, molybdenum disulfide, feldspar, glass spheres, glass fibers, chlorine containing fillers, potassium chloride, complex salts of manganese, potassium, chloride, $CaF_2$, Cryolite ($Na_3AlF_6$), potassium Cryolite ($K_3AlF_6$), pyrites, ZnS, copper sulfide, mineral oil, fluorides, carbonates, calcium carbonate, wollastonite, mullite, steel, iron, copper, brass, bronze, tin, aluminum, kyanite, alusite, garnet, quartz, fluoride, mica, nepheline syenite, sulfates (e.g., barium sulfate), carbonates (e.g., calcium carbonate), titanates (e.g., potassium titanate fibers), rock wool, clay, sepiolite, iron sulfide (e.g., $Fe_2S_3$, $FeS_2$, or a combination thereof), potassium fluoroborate ($KBF_4$), zinc borate, borax, boric acid, fine alundum powders, P15A, cork, glass spheres, silica microspheres (Z-light), silver, Saran™ resin, paradichlorobenzene, oxalic acid, alkali halides, organic halides, attapulgite or any combination thereof.

Embodiment 47

The abrasive forming mix or method of embodiment 44, wherein the abrasive forming mix comprises a filler material content of at least about 4 wt. % for a total weight of the abrasive forming mix.

Embodiment 48

The abrasive forming mix or method of embodiment 44, wherein the abrasive forming mix comprises a filler material content of not greater than about 50 wt. % for a total weight of the abrasive forming mix.

Embodiment 49

The abrasive article or method of any one of embodiments 1, 2, 3, 4, 5, 6, 13, 14, 15, 16, 17, 18, 19, 20, 21, 22, 23 and 24, wherein the abrasive article comprises an organic bond material content of at least about 2 wt. % for a total weight of the abrasive article.

Embodiment 50

The abrasive article or method of any one of embodiments 1, 2, 3, 4, 5, 6, 13, 14, 15, 16, 17, 18, 19, 20, 21, 22, 23 and 24, wherein the abrasive article comprises an organic bond material content of not greater than about 30 wt. % for a total weight of the abrasive article.

Embodiment 51

The abrasive forming mix or method of any one of embodiments 7, 8, 9, 10, 11, 12, 13, 14, 15, 16, 17, 18, 19, 20, 21, 22, 23 and 24, wherein the abrasive forming mix comprises an organic bond material content of at least about 2 wt. % for a total weight of the abrasive forming mix.

Embodiment 52

The abrasive forming mix or method of any one of embodiments 7, 8, 9, 10, 11, 12, 13, 14, 15, 16, 17, 18, 19, 20, 21, 22, 23 and 24, wherein the abrasive forming mix comprises an organic bond material content of not greater than about 30 wt. % for a total weight of the abrasive forming mix.

Embodiment 53

The abrasive article, abrasive forming mix or method of any one of the previous embodiments, wherein the organic bond material further comprises a phenolic material, a modified phenolic material, a polyimide material, a polyamide material, an epoxy material, a polyester material, a polyurethane material, a polybenzimadzole material, a rubber, a shellac, a cork and any combination thereof.

Embodiment 54

The abrasive article, abrasive forming mix or method of any one of the previous embodiments, wherein the organic bond material may consist of a phenolic material, a modified phenolic material, a polyimide material, a polyamide material, an epoxy material, a polyester material, a polyurethane material, a polybenzimadzole material, a rubber, a shellac, a cork and any combination thereof.

Embodiment 55

The abrasive article, abrasive forming mix or method of any one of the previous embodiments, wherein the organic bond material comprises a phenolic resin.

Embodiment 56

The abrasive article, abrasive forming mix or method of any one of the previous embodiments, wherein the organic bond material consists of a phenolic resin.

Embodiment 57

The abrasive article or method of any one of embodiments 1, 2, 3, 4, 5, 6, 13, 14, 15, 16, 17, 18, 19, 20, 21, 22, 23 and 24, wherein the abrasive article comprises an abrasive particle content of at least about 60 wt. % for a total weight of the abrasive article.

Embodiment 58

The abrasive article or method of any one of embodiments 1, 2, 3, 4, 5, 6, 13, 14, 15, 16, 17, 18, 19, 20, 21, 22, 23 and 24, wherein the abrasive article comprises an abrasive particle content of not greater than about 98 wt. % for a total weight of the abrasive article.

Embodiment 59

The abrasive forming mix or method of any one of embodiments 7, 8, 9, 10, 11, 12, 13, 14, 15, 16, 17, 18, 19, 20, 21, 22, 23 and 24, wherein the abrasive forming mix comprises an abrasive particle content of at least about 60 wt. % for a total weight of the abrasive mix.

Embodiment 60

The abrasive forming mix or method of any one of embodiments 7, 8, 9, 10, 11, 12, 13, 14, 15, 16, 17, 18, 19, 20, 21, 22, 23 and 24, wherein the abrasive forming mix comprises an abrasive particle content of not greater than about 98 wt. % for a total weight of the abrasive forming mix.

Embodiment 61

The abrasive article, abrasive forming mix or method of any one of the previous embodiments, wherein the abrasive particles comprise oxides, carbides, nitrides, borides, carbon-based materials (e.g., diamond), oxycarbides, oxynitrides, oxyborides, silicon dioxide, silicon carbide, alumina, zirconia, flint, garnet, emery, rare earth oxides, rare earth-containing materials, cerium oxide, sol-gel derived particles, gypsum, iron oxide, glass-containing particles, or combinations thereof.

Embodiment 62

The abrasive article, abrasive forming mix or method of any one of the previous embodiments, wherein the abrasive particles consist of oxides, carbides, nitrides, borides, carbon-based materials (e.g., diamond), oxycarbides, oxynitrides, oxyborides, silicon dioxide, silicon carbide, alumina, zirconia, flint, garnet, emery, rare earth oxides, rare earth-containing materials, cerium oxide, sol-gel derived particles, gypsum, iron oxide, glass-containing particles, or combinations thereof.

Embodiment 63

The abrasive article or method of any one of embodiments 1, 2, 3, 4, 5, 6, 13, 14, 15, 16, 17, 18, 19, 20, 21, 22, 23 and 24, wherein the abrasive article comprises a ratio $AAC_{PL}/AAC_{AP}$ of at least about 0.001, where $AAC_{PL}$ represents the content of plasticizer in the abrasive article in wt. % for a total weight of the abrasive article and $AAC_{AP}$ represents the content of abrasive particles in the abrasive article in wt. % for a total weight of the abrasive article.

Embodiment 64

The abrasive article or method of any one of embodiments 1, 2, 3, 4, 5, 6, 13, 14, 15, 16, 17, 18, 19, 20, 21, 22, 23 and 24, wherein the abrasive article or abrasive forming mix wheel comprises a ratio $AAC_{FM}/AAC_{AP}$ of not greater than about 0.3, where $AAC_{FM}$ represents the content of filler material in the abrasive article in wt. % for a total weight of the abrasive article and $AAC_{AP}$ represents the content of abrasive particles in the abrasive article in wt. % for a total weight of the abrasive article.

Embodiment 65

The abrasive forming mix or method of any one of embodiments 7, 8, 9, 10, 11, 12, 13, 14, 15, 16, 17, 18, 19, 20, 21, 22, 23 and 24, wherein the forming mixture comprises a ratio $FMC_{PL}/FMC_{AP}$ of at least about 0.001, where $FMC_{PL}$ represents the content of plasticizer in the forming mixture in wt. % for a total weight of the forming mixture and $FMC_{AP}$ represents the content of abrasive particles in the forming mixture in wt. % for a total weight of the forming mixture.

Embodiment 66

The abrasive forming mix or method of any one of embodiments 7, 8, 9, 10, 11, 12, 13, 14, 15, 16, 17, 18, 19, 20, 21, 22, 23 and 24, wherein the forming mixture comprises a ratio $FMC_{PL}/FMC_{AP}$ of not greater than about 0.3, where $FMC_{PL}$ represents the content of plasticizer in the abrasive article in wt. % for a total weight of the abrasive article and $FMC_{AP}$ represents the content of abrasive particles in the abrasive article in wt. % for a total weight of the forming mixture.

Embodiment 67

An abrasive article comprising: an organic bond material; abrasive particles contained within the organic bond material; a first plasticizer contained within the organic bond material; and a second plasticizer contained within the organic bond material, wherein the first plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof, and wherein the second plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof.

Embodiment 68

An abrasive forming mix comprising: an organic bond material; abrasive particles; a first unprocessed plasticizer; and a second unprocessed plasticizer, wherein the first unprocessed plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof, and wherein the second unprocessed plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof.

Embodiment 69

A method of forming an abrasive article, wherein the method comprises: providing an abrasive forming mix; and forming the abrasive forming mix into an abrasive article, wherein the abrasive article comprises: an organic bond material, abrasive particles, a first plasticizer contained within the organic bond material; and a second plasticizer contained within the organic bond material, wherein the first plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof, and wherein the second plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof.

Embodiment 70

A method of forming an abrasive article, wherein the method comprises: providing an abrasive forming mix comprising: an organic bond material, abrasive particles, a first unprocessed plasticizer; and a second unprocessed plasticizer, wherein the first unprocessed plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof, and wherein the second unprocessed plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde, and combinations thereof; and forming the abrasive forming mix into an abrasive article.

Embodiment 71

The abrasive article or method of any one of embodiments 67 and 69, wherein the first plasticizer is distinct from the second plasticizer.

Embodiment 72

The abrasive article or method of any one of embodiments 67 and 69, wherein the first plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde and combinations thereof.

Embodiment 73

The abrasive article or method of any one of embodiments 67 and 69, wherein the second plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde and combinations thereof.

Embodiment 74

The abrasive article or method of any one of embodiments 67 and 69, wherein the abrasive article further comprises a plasticizer ratio $AAC_{PL1}/AAC_{PL2}$ of at least about 0.2, where $AAC_{PL1}$ is equal to the content of the first plasticizer in the abrasive article and $AAC_{PL2}$ is equal to the content of the second plasticizer in the abrasive article, at least about 0.23, at least about 0.25, at least about 0.28, at least about 0.3, at least about 0.33 and at least about 0.35.

Embodiment 75

The abrasive article or method of any one of embodiments 67 and 69, wherein the abrasive article further comprises a plasticizer ratio $AAC_{PL1}/AAC_{PL2}$ of not greater than about 0.8, where $AAC_{PL1}$ is equal to the content of the first plasticizer in the abrasive article and $AAC_{PL2}$ is equal to the content of the second plasticizer in the abrasive article, not greater than about 0.78, not greater than about 0.75, not greater than about 0.73, not greater than about 0.70, not greater than about 0.68, not greater than about 0.65, not greater than about 0.63, not greater than about 0.6, not greater than about 0.58, not greater than about 0.55 and not greater than about 0.53.

Embodiment 76

The abrasive article or method of any one of embodiments 67 and 69, wherein the abrasive article further comprises a combined content of the first plasticizer in the abrasive article and the second plasticizer in the abrasive article is not greater than 5 wt. % for a total weight of the abrasive article, not greater than about 4.5 wt. %, not greater than about 4.0 wt. %, not greater than about 3.5 wt. %, not greater than about 3.0 wt. %, not greater than about 2.5 wt. %, not greater than about 2.0 wt. %, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. % and not greater than about 1 wt. %.

Embodiment 77

The abrasive article or method of any one of embodiments 67 and 69, wherein the abrasive article further comprises a combined content of the first plasticizer in the abrasive article and the second plasticizer in the abrasive article at least about 0.001 wt. % for a total weight of the abrasive article, at least about 0.01 wt. % or even at least about 0.1 wt. %.

Embodiment 78

The abrasive article or method of any one of embodiments 67 and 69, wherein a content of the first plasticizer in the abrasive article is not greater than 2.5 wt. % for a total weight of the abrasive article, not greater than about 2.0 wt. %, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. % and not greater than about 1 wt. %.

Embodiment 79

The abrasive article or method of any one of embodiments 67 and 69, wherein a content of the first plasticizer in the abrasive article is at least about 0.001 wt. % for a total weight of the abrasive article, at least about 0.01 wt. % or even at least about 0.1 wt. %.

Embodiment 80

The abrasive article or method of any one of embodiments 67 and 69, wherein a content of the second plasticizer in the abrasive article is not greater than 5 wt. % for a total weight of the abrasive article, not greater than about 4.5 wt. %, not greater than about 4.0 wt. %, not greater than about 3.5 wt. %, not greater than about 3.0 wt. %, not greater than about 2.5 wt. %, not greater than about 2.0 wt. %, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. % and not greater than about 1 wt. %.

Embodiment 81

The abrasive article or method of any one of embodiments 67 and 69, wherein a content of the second plasticizer in the abrasive article is at least about 0.001 wt. % for a total weight of the abrasive article, at least about 0.01 wt. % or even at least about 0.1 wt. %.

Embodiment 82

The abrasive forming mix or method of any one of embodiments 68 and 70, wherein the first unprocessed plasticizer is distinct from the second unprocessed plasticizer.

Embodiment 83

The abrasive forming mix or method of any one of embodiments 68 and 70, wherein the first unprocessed plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde and combinations thereof.

Embodiment 84

The abrasive forming mix or method of any one of embodiments 68 and 70, wherein the second unprocessed plasticizer comprises a compound selected from the group consisting of methyl benzoate, ethyl benzoate, propyl benzoate, methyl anthranilate, 5-methylfurfural, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldhyde, o-tolualdehyde, salicylaldehyde, p-tolualdehyde and combinations thereof.

Embodiment 85

The abrasive forming mix or method of any one of embodiments 68 and 70, wherein the forming mix further comprises a plasticizer ratio $FMC_{PL1}/FMC_{PL2}$ of at least about 0.2, where $FMC_{PL1}$ is equal to the content of the first unprocessed plasticizer in the forming mix and $FMC_{PL2}$ is equal to the content of the second unprocessed plasticizer in the forming mix, at least about 0.23, at least about 0.25, at least about 0.28, at least about 0.3, at least about 0.33 and at least about 0.35.

Embodiment 86

The abrasive forming mix or method of any one of embodiments 68 and 70, wherein the forming mix further comprises a plasticizer ratio $FMC_{PL1}/FMC_{PL2}$ of not greater than about 0.8, where $FMC_{PL1}$ is equal to the content of the first unprocessed plasticizer in the forming mix and $FMC_{PL2}$ is equal to the content of the second unprocessed plasticizer in the forming mix, not greater than about 0.78, not greater than about 0.75, not greater than about 0.73, not greater than about 0.70, not greater than about 0.68, not greater than about 0.65, not greater than about 0.63, not greater than about 0.6, not greater than about 0.58, not greater than about 0.55 and not greater than about 0.53.

Embodiment 87

The abrasive forming mix or method of any one of embodiments 68 and 70, wherein the forming mix further comprises a combined content of the first unprocessed plasticizer in the forming mix and the second unprocessed plasticizer in the forming mix is not greater than 5 wt. % for a total weight of the forming mix, not greater than about 4.5 wt. %, not greater than about 4.0 wt. %, not greater than about 3.5 wt. %, not greater than about 3.0 wt. %, not greater than about 2.5 wt. %, not greater than about 2.0 wt. %, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. % and not greater than about 1 wt. %.

Embodiment 88

The abrasive forming mix or method of any one of embodiments 68 and 70, wherein the forming mix further comprises a combined content of the first unprocessed plasticizer in the forming mix and the second unprocessed plasticizer in the abrasive article at least about 0.001 wt. % for a total weight of the forming mix, at least about 0.01 wt. % or even at least about 0.1 wt. %.

Embodiment 89

The abrasive forming mix or method of any one of embodiments 68 and 70, wherein a content of the first unprocessed plasticizer in the forming mix is not greater than 2.5 wt. % for a total weight of the forming mix, not greater than about 2.0 wt. %, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. % and not greater than about 1 wt. %.

Embodiment 90

The abrasive forming mix or method of any one of embodiments 68 and 70, wherein a content of the first unprocessed plasticizer in the abrasive article is at least about 0.001 wt. % for a total weight of the abrasive article, at least about 0.01 wt. % or even at least about 0.1 wt. %.

Embodiment 91

The abrasive forming mix or method of any one of embodiments 68 and 70, wherein a content of the second unprocessed plasticizer in the forming mix is not greater than 5 wt. % for a total weight of the forming mix, not greater than about 4.5 wt. %, not greater than about 4.0 wt. %, not greater than about 3.5 wt. %, not greater than about 3.0 wt. %, not greater than about 2.5 wt. %, not greater than about 2.0 wt. %, not greater than about 1.9 wt. %, not greater than about 1.8 wt. %, not greater than about 1.7 wt. %, not greater than about 1.6 wt. %, not greater than about 1.5 wt. %, not greater than about 1.4 wt. %, not greater than about 1.3 wt. %, not greater than about 1.2 wt. %, not greater than about 1.1 wt. % and not greater than about 1 wt. %.

Embodiment 92

The abrasive forming mix or method of any one of embodiments 68 and 70, wherein a content of the first unprocessed plasticizer in the forming mix is at least about 0.001 wt. % for a total weight of the forming mix, at least about 0.01 wt. % or even at least about 0.1 wt. %.

EXAMPLES

Example 1

Five sample abrasive wheels S1 and S2 were formed according to embodiments described herein and two comparative abrasive wheels CS1 and CS2 were formed for comparison to sample abrasive wheels S1 and S2. Table 1 below summarizes the composition of each abrasive forming mix used to form sample abrasive wheels S1 and S2 and comparative abrasive wheels CS1 and CS2.

TABLE 1

Abrasive Forming Mix Compositions

| Components | Component Concentration in Wt. % for Total Weight of Mix | | | |
| --- | --- | --- | --- | --- |
| | S1 | S2 | CS1 | CS2 |
| Abrasive - $Al_2O_3$ Grains | 85.68 | 85.68 | 85.68 | 86.03 |
| Resole Phenolic Resin (Liquid) | 2.64 | 2.64 | 2.64 | 2.66 |
| Phenolic Resin (Powder) | 9.01 | 9.01 | 9.01 | 9.05 |
| Burnt Lime; CaO + MgO | 0.45 | 0.45 | 0.45 | 0.45 |
| $Fe_2O_3$ | 1.8 | 1.8 | 1.8 | 1.81 |
| Plasticizer - Methyl Anthranilate | 0.42 | — | — | — |
| Plasticizer - Methyl Benzoate | — | 0.42 | — | — |
| Plasticizer - Carbosota | — | — | 0.42 | — |

Plasticizer characteristics of the plasticizers used in sample abrasive wheels S1 and S2 and comparative abrasive wheel CS1 are summarized in Table 2 below.

TABLE 2

Plasticizer Characteristics

| Plasticizer Characteristics | S1 | S2 | CS1 |
| --- | --- | --- | --- |
| Boiling Point (° C.) | 256 | 199.6 | >230 |
| Vapor Pressure (in pascals as measured at 20° C.) | 100 | 36 | <100 |

Abrasive wheel characteristics of the sample abrasive wheels S1 and S2 and of the two comparative abrasive wheels CS1 and CS2 were tested. Abrasive wheel characteristics include E-MOD, wet burst speed, dry burst speed, 3-point bending and density. The abrasive wheel characteristics for the sample abrasive wheels S1 and S2 and the two comparative abrasive wheels CS1 and CS2 are summarized in Table 3 below.

TABLE 3

Abrasive Wheel Characteristics

| Characteristics | S1 | S2 | CS1 | CS2 |
| --- | --- | --- | --- | --- |
| E-MOD (GPA) | 20.5 ± 0.6 | 20.5 ± 0.1 | 19.9 ± 0.6 | 19.7 ± 0.3 |
| Dry Burst Speed (m/s) | 125.3 ± 6.6 | 122.8 ± 2.4 | 123.3 ± 3.2 | 115.4 ± 1.6 |
| Wet Burst Speed (m/s) | 114.8 ± 5.1 | 113.2 ± 2.4 | 116.5 ± 3.3 | 94.4 ± 7.1 |
| 3-Point Bending (MPa) | 30.7 ± 1.2 | 28.3 ± 2.3 | 29.8 ± 2.9 | 27.1 ± 1.6 |
| Density (g/cm$^3$) | 2.18 ± 0.019 | 2.18 ± 0.007 | 2.17 ± 0.014 | 2.18 ± 0.011 |

Example 2

Five samples of plasticizer were evaluated using LFNMR to determine their crosslinking density factor. As described herein, the crosslinking density factor is defined as the percent increase of the Low Field NMR (LFNMR) signal of an abrasive article formed with a plasticizer as described herein as compared to the LFNMR signal of an abrasive article formed without the plasticizer. The crosslinking density factor may be calculated based on the equation $((AAP_{LFNMR} - AA_{LFNMR})/AA_{LFNMR})*100$, where $AAP_{LFNMR}$ is equal to the T1 relaxation time of the abrasive article formed from an abrasive forming mix with the plasticizer and $AA_{LFNMR}$ is equal to the T1 relaxation time of an abrasive article formed from an identical abrasive forming mix without a plasticizer. The T1 relaxation times are measured using LFNMR at 50° C. The crosslinking density factor for each sample plasticizer is summarized in Table 4 below.

TABLE 4

Plasticizer Crosslinking Density Factors, Case 1

| Plasticizer | Crosslinking Density Factor |
| --- | --- |
| Furfural | 69 |
| Anthracene Oil | 78 |
| Methyl Benzoate | 56 |
| Creosote Oil | 58 |
| Methyl Anthranilate | 78 |

Sixteen additional samples of plasticizer were evaluated using LFNMR to determine their crosslinking density factor. The crosslinking density factor for each sample plasticizer is summarized in Table 5 below.

TABLE 5

Plasticizer Crosslinking Density Factors, Case 2

| Plasticizer | Crosslinking Density Factor |
| --- | --- |
| furfural | 52 |
| 5-methylfurfural | 47 |
| ethyl benzoate | 23 |
| propyl benzoate | 12 |
| ethyl 2-aminobenzoate | 42 |
| m-anisaldehyde | 53 |
| p-anisaldehyde | 27 |
| cuminaldehyde | −1 |
| o-tolualdehyde | 29 |
| p-tolualdehyde | 26 |
| salicylaldehyde | 42 |
| 4-ethylbenzaldehyde | 26 |
| α-amylcinnamaldehyde | 8 |
| dimethyl anthranilate | 41 |
| 2-aminoacetophenone | 55 |

The present application represents a departure from the state of the art. Notably, the embodiments herein demonstrate improved and unexpected performance over abrasive articles formed according to conventional methods. While not wishing to be bound to a particular theory, it is suggested that the combination of certain features including processes, materials and the like, may facilitate improvements, such as, lower toxicities of during forming and use of the abrasive article and improved crosslinking density within the abrasive articles as compared to conventional abrasive articles. Such improved crosslinking density may facilitate high abrasive article performance. The combination of features can include, but is not limited to, an abrasive forming mix and abrasive article that includes particular plasticizers having specific characteristics, such as, boiling points, vapor pressures, and particular concentrations of plasticizers having these characteristics within the abrasive forming mix and abrasive articles.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The description in combination with the FIGURES is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one of at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

What is claimed is:

1. An abrasive article comprising:
an organic bond material;
abrasive particles contained within the organic bond material; and
a first plasticizer contained within the organic bond material,
wherein the first plasticizer comprises at least one of an aromatic phenyl group, a heteroaromatic furyl group, or a saturated aliphatic hydrocarbon, and wherein the first plasticizer comprises at least one polar group,
wherein the first plasticizer is a compound selected from the group consisting of methyl benzoate, ethyl benzoate, propyl benzoate, methyl anthranilate, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldehyde, o-tolualdehyde, salicylaldehyde, p-tolualdehyde, and combinations thereof, and
wherein the abrasive article further comprises a ratio $AAC_{PL}/AAC_{OBM}$ of at least about 0.01 and not greater than about 0.25, wherein $AAC_{PL}$ is a content of plasticizer in weight percent for a total weight of the abrasive article and $AAC_{OBM}$ is a content of organic bond material in weight percent for a total weight of the abrasive article.

2. An abrasive article comprising:
an organic bond material;
abrasive particles contained within the organic bond material; and
a first plasticizer contained within the organic bond material,
wherein the abrasive article has a crosslinking density factor of at least about 10,
wherein the first plasticizer is a compound selected from the group consisting of methyl benzoate, ethyl benzoate, propyl benzoate, methyl anthranilate, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldehyde, o-tolualdehyde, salicylaldehyde, p-tolualdehyde, and combinations thereof, and
wherein the abrasive article further comprises a ratio $AAC_{PL}/AAC_{OBM}$ of at least about 0.01 and not greater than about 0.25, wherein $AAC_{PL}$ is a content of plasticizer in weight percent for a total weight of the abrasive article and $AAC_{OBM}$ is a content of organic bond material in weight percent for a total weight of the abrasive article.

3. The abrasive article of claim 1, wherein the first plasticizer further comprises a boiling point of at least about 180° C.

4. The abrasive article of claim 1, wherein the first plasticizer further comprises a vapor pressure of not greater than about 267 pascals as measured at a temperature of 20° C.

5. The abrasive article of claim 2, wherein the first plasticizer comprises an aromatic phenyl group, a heteroaromatic furyl group, or a saturated aliphatic hydrocarbon.

6. The abrasive article of claim 1, wherein the first plasticizer comprises at least one functional group selected from the group consisting of an aldehyde, a ketone, an ester, an ether, an alcohol, an amine, an amide and combinations thereof.

7. The abrasive article of claim 1, wherein the abrasive article further comprises a filler material.

8. The abrasive article of claim 7, wherein the filler material is selected from a group consisting of sand, bubble alumina, chromites, magnesite, dolomites, bubble mullite, borides, titanium dioxide, carbon products, silicon carbide, wood flour, clay, talc, hexagonal boron nitride, molybdenum disulfide, feldspar, glass spheres, glass fibers, chlorine containing fillers, potassium chloride, complex salts of manganese, potassium, chloride, $CaF_2$, Cryolite ($Na_3AlF_6$), potassium Cryolite ($K_3AlF_6$), pyrites, ZnS, copper sulfide, mineral oil, fluorides, carbonates, calcium carbonate, wollastonite, mullite, steel, iron, copper, brass, bronze, tin, aluminum, kyanite, alusite, garnet, quartz, fluoride, mica, nepheline syenite, sulfates, carbonates, titanates, rock wool, clay, sepiolite, iron sulfide, potassium fluoroborate ($KBF_4$), zinc borate, borax, boric acid, fine alundum powders, P15A, cork, glass spheres, silica microspheres (Z-light), silver, paradichlorobenzene, oxalic acid, alkali halides, organic halides, attapulgite and combinations thereof.

9. The abrasive article of claim 7, wherein the abrasive article comprises a filler material content of at least about 4 wt. % and not greater than about 50 wt. % for a total weight of the abrasive article.

10. The abrasive article of claim 1, wherein the abrasive article comprises an organic bond material content of at least about 2 wt. % and not greater than about 30 wt. % for a total weight of the abrasive article.

11. The abrasive article of claim 1, wherein the organic bond material is selected from a group consisting of a phenolic material, a modified phenolic material, a polyimide material, a polyamide material, an epoxy material, a polyester material, a polyurethane material, a polybenzimadzole material, a rubber, a shellac, a cork and any combination thereof.

12. The abrasive article of claim 1, wherein the abrasive article comprises an abrasive particle content of at least about 60 wt. % for a total weight of the abrasive article.

13. An abrasive article comprising: an organic bond material; abrasive particles contained within the organic bond material; a first plasticizer contained within the organic bond material; and a second plasticizer contained within the organic bond material, wherein the second plasticizer is different than the first plasticizer, wherein the first plasticizer is a compound selected from the group consisting of methyl benzoate, ethyl benzoate, propyl benzoate, methyl anthranilate, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldehyde, o-tolualdehyde, salicylaldehyde, p-tolualdehyde, and combinations thereof, wherein the second plasticizer is a compound selected from the group consisting of methyl benzoate, ethyl benzoate, propyl benzoate, methyl anthranilate, 2'-aminoacetophenone, α-amylcinnamaldehyde, m-anisaldehyde, p-anisaldehyde, cuminaldehyde, dimethyl anthranilate, ethyl 2-aminobenzoate, 4-ethylbenzaldehyde, o-tolualdehyde, salicylaldehyde, p-tolualdehyde, and combinations thereof, and wherein the abrasive article further comprises a ratio $AAC_{PL}/AAC_{OBM}$ of at least about 0.01 and not greater than about 0.25, wherein $AAC_{PL}$ is a content of plasticizer in weight percent for a total weight of the abrasive article and $AAC_{OBM}$ is a content of organic bond material in weight percent for a total weight of the abrasive article.

14. The abrasive article of claim 13, wherein the abrasive article further comprises a plasticizer ratio $AAC_{PL1}/AAC_{PL2}$ of at least about 0.2, where $AAC_{PL1}$ is equal to the content of the first plasticizer in the abrasive article and $AAC_{PL2}$ is equal to the content of the second plasticizer in the abrasive article.

15. The abrasive article of claim 13, wherein the abrasive article further comprises a combined content of the first plasticizer in the abrasive article and the second plasticizer in the abrasive article is not greater than 5 wt. % for a total weight of the abrasive article.

16. The abrasive article of claim 13, wherein a content of the first plasticizer in the abrasive article is not greater than 2.5 wt. % for a total weight of the abrasive article.

17. The abrasive article of claim 13, wherein a content of the second plasticizer in the abrasive article is not greater than 5 wt. % for a total weight of the abrasive article.

* * * * *